United States Patent
Bhatnagar et al.

(10) Patent No.: US 11,349,935 B2
(45) Date of Patent: May 31, 2022

(54) METHODS AND APPARATUS TO GENERATE MIGRATION RECOMMENDATIONS TO MIGRATE SERVICES BETWEEN GEOGRAPHIC REGIONS

(71) Applicant: VMware, Inc., Palo Alto, CA (US)

(72) Inventors: Yash Bhatnagar, Bangalore (IN); Chandrashekhar Jha, Bangalore (IN); Amit Kumar, Bangalore (IN); Rajat Garg, Bangalore (IN); Kruti Erraguntala, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/689,098

(22) Filed: Nov. 20, 2019

(65) Prior Publication Data

US 2021/0029204 A1     Jan. 28, 2021

(30) Foreign Application Priority Data

Jul. 24, 2019    (IN) .............................. 201941029899

(51) Int. Cl.
*H04L 67/148* (2022.01)
*H04L 67/1021* (2022.01)
(Continued)

(52) U.S. Cl.
CPC ............ *H04L 67/148* (2013.01); *H04L 41/22* (2013.01); *H04L 43/0894* (2013.01);
(Continued)

(58) Field of Classification Search
CPC ............... H04L 67/148; H04L 67/1021; H04L 67/1014; H04L 41/22; H04L 43/0894; H04L 43/16
See application file for complete search history.

(56) References Cited

U.S. PATENT DOCUMENTS

| 8,745,233 | B2 * | 6/2014 | Bartfai-Walcott | .... G06F 9/4856 |
| | | | | 718/1 |
| 9,537,938 | B2 * | 1/2017 | Thomas | ................ H04L 67/148 |

(Continued)

OTHER PUBLICATIONS

Kubernetes, "Production-Grade Container Orchestration, Automated Container Deployment, Scaling and Management," Nov. 18, 2019, <https://kubernetes.io/>, 8 pages.

(Continued)

*Primary Examiner* — Ramy M Osman
(74) *Attorney, Agent, or Firm* — Hanley, Flight & Zimmerman, LLC

(57) ABSTRACT

A disclosed example to determine a migration recommendation of a service between geographic regions includes: a graph generator to generate an interaction graph, the interaction graph including first and second nodes and an edge therebetween, the first node representative of a first service in a first geographic region, the second node representative of a second service in a second geographic region, and the edge representative of a network path of interactions between the first and second services; a weighing engine to determine a weight value of the edge between the first and second services based on a count of network interactions between the first and second services and a real-time latency between the first and second services; and a recommendation engine to generate a migration recommendation to migrate the first service to the second geographic region based on the weight value of the edge.

25 Claims, 8 Drawing Sheets

(51) Int. Cl.
*H04L 41/22* (2022.01)
*H04L 43/0894* (2022.01)
*H04L 43/16* (2022.01)
*H04L 67/1014* (2022.01)

(52) U.S. Cl.
CPC .......... *H04L 43/16* (2013.01); *H04L 67/1014* (2013.01); *H04L 67/1021* (2013.01)

(56) References Cited

U.S. PATENT DOCUMENTS

| | | | | |
|---|---|---|---|---|
| 10,846,129 | B2* | 11/2020 | Hermenier | H04L 67/101 |
| 11,228,516 | B1* | 1/2022 | Harwani | H04L 47/70 |
| 2012/0151061 | A1* | 6/2012 | Bartfai-Walcott | G06F 9/4856 |
| | | | | 709/226 |
| 2012/0278571 | A1* | 11/2012 | Fleming | H04L 29/08 |
| | | | | 711/162 |
| 2012/0297238 | A1* | 11/2012 | Watson | G06F 9/5088 |
| | | | | 714/4.11 |
| 2013/0286837 | A1* | 10/2013 | Khanchi | H04L 47/11 |
| | | | | 370/235 |
| 2014/0164591 | A1* | 6/2014 | Bickford | G06F 9/45558 |
| | | | | 709/224 |
| 2016/0170791 | A1* | 6/2016 | Huh | G06F 9/5088 |
| | | | | 718/1 |
| 2017/0295246 | A1* | 10/2017 | Georgiou | H04L 67/148 |
| 2018/0024894 | A1* | 1/2018 | Naik | G06F 3/0647 |
| | | | | 711/162 |
| 2018/0307512 | A1* | 10/2018 | Balma | G06F 9/45558 |
| 2020/0293501 | A1* | 9/2020 | Awasthi | G06F 16/1844 |
| 2021/0029204 | A1* | 1/2021 | Bhatnagar | H04L 43/16 |

OTHER PUBLICATIONS

VMware, "vRealize Operations," Jun. 8, 2017, <https://www.vmware.com/in/products/vrealize-operations.html>, 18 pages.
VMware, "Cloudhealth," Cloud Management & Optimization, Nov. 4, 2019, >https://www.cloudhealthtech.com/>, 6 pages.
Wikipedia, "Exponential Smoothing," Nov. 8, 2019, <https://en.wikipedia.org/wiki/Exponential_smoothing>, 9 pages.
Wikipedia, "Graph (abstract data type)," Nov. 8, 2019, <https://en.wikipedia.org/wiki/Graph_(abstract_data_type)>, 4 pages.
Microsoft, "Azure Global Infrastructure, Azure regions," Microsoft Azure, Aug. 20, 2019, <https://azure.microsoft.com/en-in/global-infrastructure/regions/>, 6 pages.
Amazon Web Services, "AWS Service Endpoints," AWS General Reference, Nov. 16, 2019, <https://docs.aws.amazon.com/general/latest/gr/rande.html>, 176 pages.
Google, "Cloud Locations," Google Cloud, Nov. 19, 2019, <https://cloud.google.com/about/locations/>, 17 pages.
Cloudping, "AWS Inter-Region Latency," AWS Inter-Region Latency Monitoring, May 30, 2019, <https://www.cloudping.co/>, 1 page.
Azurespeed, "Azure Latency Test," Oct. 23, 2019, <http://www.azurespeed.com/>, 1 page.
Kubernetes, "Concepts," Federation-Kubernetes, Jul. 16, 2019, <https://kubernetes.io/docs/concepts/cluster-administration/federation/>, 8 pages.
VMware, "Enterprise Pivotal Container Service (Enterprise PKS)," Nov. 12, 2019, <https://cloud.vmware.com/pivotal-container-service>, 5 pages.

* cited by examiner

116

| NETWORK SOURCE | NETWORK DESTINATION | AVERAGE COUNT |
|---|---|---|
| SERVICE A | SERVICE B | 35 |
| SERVICE C | SERVICE B | 140 |
| SERVICE B | SERVICE D | 3 |
| ... | ... | ... |

INTERACTION COUNTS RECORDS

FIG. 2

| FROM | TO | CURRENT SMOOTHENED LATENCY |
|---|---|---|
| REGION 1 | REGION 2 | 23.56 ms |
| REGION 1 | REGION 3 | 26.55 ms |
| REGION 2 | REGION 3 | 56.23 ms |
| ... | ... | ... |

SMOOTHENED LATENCY RECORDS

METHODS AND APPARATUS TO GENERATE MIGRATION RECOMMENDATIONS TO MIGRATE SERVICES BETWEEN GEOGRAPHIC REGIONS

RELATED APPLICATIONS

Benefit is claimed under 35 U.S.C. 119(a)-(d) to Foreign Application Serial No. 201941029899 filed in India entitled "METHODS AND APPARATUS TO GENERATE MIGRATION RECOMMENDATIONS TO MIGRATE SERVICES BETWEEN GEOGRAPHIC REGIONS", on Jul. 24, 2019, by VMWARE, INC., which is herein incorporated in its entirety by reference for all purposes.

FIELD OF THE DISCLOSURE

The present disclosure relates generally to network-based computing and, more particularly, to methods and apparatus to generate migration recommendations to migrate services between geographic regions.

BACKGROUND

Virtualizing computer systems provides benefits such as the ability to execute multiple computer systems on a single hardware computer, replicating computer systems, moving virtual machines (VMs), containers, and/or workloads across multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc. The racks may be used to run VMs that execute workloads, some of which communicate with other workloads within the same rack and/or across different racks which may be co-located in a same facility or located in different facilities.

Containerization is a technique to isolate services running on the same hardware into respective executing environments. A container can be used to place an application or program and its dependencies (e.g., libraries, drivers, configuration files, etc.) into a single package that executes as its own executable environment on hardware. A containerized service from one container restricts containerized services from other containers from accessing its resources. Containerization provides security and scalable resource usage in a multi-service environment. A containerized infrastructure can have large numbers of micro-services executing in different geographic regions. Such micro-services interact with one another across the geographic regions to provide similar functionality in a distributed manner to implement a large distributed application across the geographic regions.

BRIEF DESCRIPTION OF THE DRAWINGS

FIG. 2 is an example interaction counts records table including interaction counts of FIG. 1 logged in association with network sources and network destinations.

Figure 1:
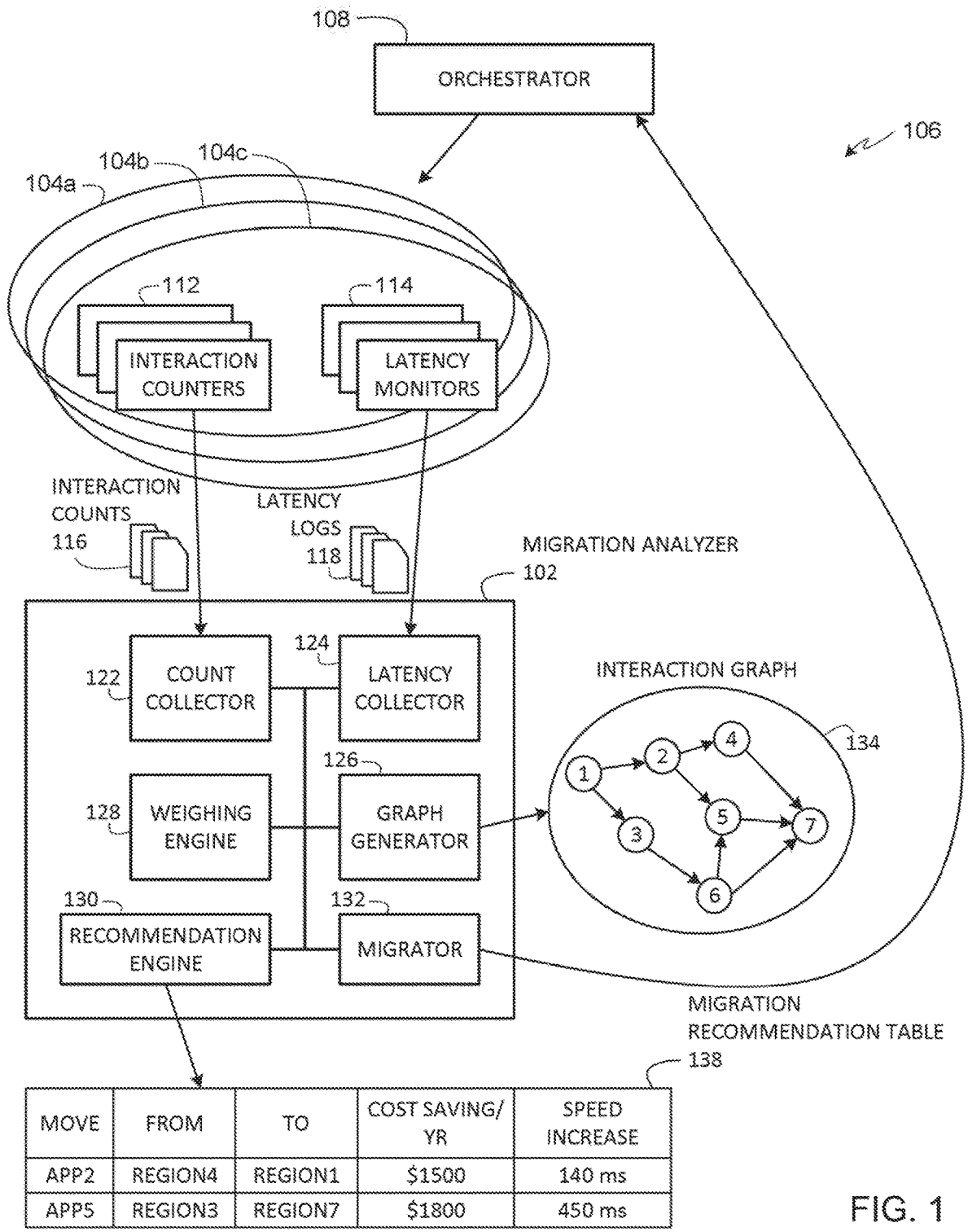
FIG. 1 is an example migration analyzer that monitors services across multiple geographic regions of a multi-region distributed computing environment to generate service migration recommendations.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In distributed applications with components deployed across multiple locations, a major bottleneck that determines overall responsiveness and throughput is the time spent on communicating between these components. The problem is even more pronounced when the components are instantiated across multiple geographic locations or regions, since large geographic separations create high latency in network communication transmissions between different internet hubs in different geographic regions (e.g., municipalities, territories, countries, regions separated by bodies of water, regions around the world, etc.). In some deployments, an application can be deployed to execute across multiple geographic regions. In such deployments, different components of that application can be instantiated across those multiple geographic regions. Those distributed components include services (e.g., micro-services) that perform local data processing in ones of the geographic regions. Instantiating services of an application in different geographic regions can be done to reduce or eliminate latencies associated with sending data from a local geographic region to be processed by a service at a distantly located geographic region. In some deployments a same service is replicated in two or more geographic regions when having that same service process data locally would increase responsiveness of delivering results based on local data. For example, a same web server service may be replicated in multiple geographic regions so that client devices at those different geographic regions can access web pages faster when served locally by the locally replicated web server service than when web pages are accessed from a distantly located web page server in another geographic region.

Distributed deployments in which services are replicated across multiple geographic regions may be implemented using any type of virtualization infrastructures including virtual machine (VM) computing infrastructures, container computing infrastructures, cloud computing infrastructures, etc. For example, in a VM-based deployment, VMs deployed across multiple geographic regions can run replicated services. In a container-based deployment, containers deployed across multiple geographic regions can run replicated services. Cloud computing infrastructures can be based on VM-based deployments that run replicated services sand/or container-based deployments that run replicated services.

Examples disclosed herein may be used with one or more different types of virtualization environments. Three example types of virtualization environments are: full virtualization, paravirtualization, and OS virtualization. Full virtualization, as used herein, is a virtualization environment in which hardware resources are managed by a hypervisor to provide virtual hardware resources to a VM. In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical RAM with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

Containerization is an OS virtualization technique used to distribute functions of an application to be executed at different geographic regions as containerized services (e.g., containerized micro-services). Containerization isolates services running on the same hardware into respective executing environments. A container can be used to place an application or program and its dependencies (e.g., libraries, drivers, configuration files, etc.) into a single package that executes as its own executable environment on hardware. Through such isolation, containerized services are restricted from accessing resources of other containerized services. Such containerized services are deployed in respective container environments at different geographic locations and communicate with one another across the geographic locations by employing network communications. In this manner, the containerized services coordinate their respective functionalities to accomplish a larger operation(s) of the distributed application. Container orchestration services can be used to coordinate or orchestrate the deployments and inter-operability of containerized services across geographic regions. Kubernetes® cluster orchestration system is an example of one such container orchestration service. For example, the Kubernetes® cluster orchestration system, like other container orchestration services, provides options such as federated clusters to deploy the same containerized service in multiple geographic regions (e.g., containerized services can be deployed in two different geographic regions) to provide local processing to reduce the latency with which that service processes inputs and provides results in those different geographic regions. This leads to significant infrastructural costs and uses many man-hours of time in selecting the appropriate geographic regions to replicate the services, based on requests from client devices or endpoint devices for such services.

In some examples, a data center (or pool of linked data centers) that implements examples disclosed herein may be based on a single type of virtualization environment or may include multiple different types of virtualization environments. For example, a data center may include hardware resources that are managed by a full virtualization environment, a paravirtualization environment, and/or an OS virtualization environment (e.g., a container environment). In such a data center, a workload may be deployed to any of the virtualization environments. Although some aspects of examples disclosed herein may be described in connection with aspects of containerization (e.g., containerized services) and/or other aspects may be described in connection with VM computing infrastructures and/or other types of virtualization infrastructures, examples disclosed herein may be implemented for services executing in any type of and/or multiple types of virtualization environments or infrastructures.

In virtualized infrastructures (e.g., containerized infrastructures, VM infrastructures, etc.), where each deployed service (e.g., containerized service, service running in a VM, etc.) is meant to handle a specific part of an application, there is a close integration between these services, requiring significant communications. In deployments across multiple geographic regions, high network latencies in cross-region (e.g., inter-region) communications significantly impact the overall performance of an application. In containerized infrastructures, container orchestration services (e.g., the Kubernetes® cluster orchestration system) provide options to replicate a same service in multiple geographic regions (e.g., federated clusters in which services can be replicated in two different geographic regions for faster access). However, such prior technique is not scalable. In addition, there are various problems that arise when large applications use a significant number of network connections between different inter-region services. For example, such dense population of network connections incur high infrastructural costs, cause slow deployment, and result in unnecessary replication. High infrastructural costs are incurred because an increase in regions that applications interact with increases the service replications needed in those regions, thereby increasing the cost of running the application as multiple instances. Slow deployment occurs when there is a significant amount of time needed to understand application interactions and flows, resulting in slower deployment. Application deployment is also prone to human error, especially when there are complex interactions. Unnecessary replication arises when services are replicated in multiple geographic regions even though such services do not interact with one another as frequently as others and/or when interactions between certain network hubs are fast enough to be ignored (particularly when considered in light of frequency of the need for the interactions). Also, some services, such as backend job processing, are not time critical. Replicating such non-time-critical services across multiple geographic regions is unnecessary. In these cases, and others, the cost of replicating does not justify the benefits. As such, there are instances in which it is not necessary to replicate all services of an application.

Examples disclosed herein overcome drawbacks associated with deploying services across multiple geographic regions by automatically evaluating network interactions between multiple services, considering network latencies of networks over which distributed applications communicate, and recommending migration plans for migrating services across geographic regions to reduce the overall communication time spent between the multiple services. In examples disclosed herein, migrating a service between geographic regions means migrating a service from a first geographic region to a second geographic region by instantiating or deploying that service in the second geographic region and stopping the same service in the first geographic region. In an example of a containerized infrastructure, a containerized service running in the first geographic region is started as the same containerized service in the second geographic region and ended in the first geographic region so that the containerized service runs in the second geographic region and is not replicated in the first geographic region. In an example of a VM infrastructure, a service executed by a workload in a VM in the first geographic region is started by a workload in a VM in the second geographic region and the same service is ended in the first geographic region so that the service is executed by the VM in the second geographic region and is not replicated in the VM in the first geographic region. Examples disclosed herein automatically reduce (e.g., minimize) the overall time spent on communications between different services in a virtualized infrastructure spanning multiple geographic regions. In particular, rather than blind replication of same services across multiple geographic regions, examples disclosed herein reduce the overall application response time by identifying and making recommendations for services that are candidates for migrating to other geographic regions to reduce communication latencies with their peer services. In this manner, selected ones of the service candidates can be migrated across the geographic regions based on the network latency and their effective impacts on decreasing application response time.

Examples disclosed herein can be integrated with many containerization and/or virtualization computing products such as application network traffic services, container orchestration services (e.g., the Kubernetes® cluster orchestration system), containerized infrastructures, VM computing infrastructures, cloud computing infrastructures, etc. Examples disclosed herein can be implemented with cluster management services (e.g., VMware Smart Cluster™ cluster management functionality of VMware Cloud PKS) to provide automated recommendations and insights to customers about their cross-region (e.g., inter-region) application interactions and potential performance improvement opportunities associated with migrating one or more services across geographic regions.

Examples disclosed herein can be used by containerization services that use container orchestration services (e.g., the Kubernetes® cluster orchestration system) and/or any other virtualization services (e.g., VMware cloud products such as VMware Cloud Automation, Cloud-Health, etc.). For example, techniques disclosed herein can help in reducing operating costs associated with containerized infrastructures by reducing unnecessary replications of services that would otherwise be made by federated container orchestration services (e.g., federated by the Kubernetes® cluster orchestration system). Examples disclosed herein include a recommendation engine (e.g., the recommendation engine 130 of FIG. 1) to make migration recommendations regarding services that can be migrated between geographic regions. Such recommendation engine can be implemented in network virtualization services (e.g., VMware vRealize® Network Insight) to generate additional details for application interactions such as average network latency between services, possible migrations of services across regions for faster responses, etc. Examples disclosed herein may be used to provide fault-tolerant and high-performance services and/or to help customers, or end users, of cloud services save costs.

FIG. 1 is an example migration analyzer 102 that monitors services across multiple geographic regions 104a-c of a multi-region distributed computing environment 106 to generate service migration recommendations. For example, the geographic regions 104a-c may be municipalities, counties, states, territories, provinces, countries, and/or any other geographic regions demarcated by governmental boundaries, man-made boundaries, and/or natural boundaries. The migration analyzer 102 analyzes interaction performances between services in the multiple geographic regions 104a-c to generate recommendations of ones of the services that could be migrated between geographic regions 104a-c to improve latency performance. Although three geographic regions 104a-c are shown, examples disclosed herein may be implemented with fewer or more geographic regions. In addition, although examples disclosed herein are described in connection with geographic regions, examples disclosed herein may be implemented for different granularities of operating environments of services. For example, instead of geographic regions, examples disclosed herein may be employed to generate migration recommendations to migrate services between data centers, between physical server racks, and/or between any other size and/or type of operating environment.

To coordinate deployment and configurations of services across the geographic regions 104a-c, the multi-region distributed computing environment 106 includes an example orchestrator 108. The example orchestrator 108 may be implemented using, for example, a Kubernetes® cluster orchestration system server for container service orchestration, a VMware Cloud Automation server for orchestration of VM-based services, and/or any other suitable orchestration service. When an entity desires to implement an application across multiple regions, the entity can provide the application and its deployment parameters to the orchestrator 108. The example orchestrator 108 uses the deployment parameters to identify ones of the geographic regions 104a-c in which to deploy services of the application to implement distributed functionalities of the application. As part of the deployment process, the orchestrator 108 replicates services in different ones of the geographic regions 104a-c in an attempt to provide local low-latency computing to process data received in those geographic regions 104a-c and provide corresponding results for users in those geographic regions 104a-c. The orchestrator 108 can manage services directly and/or can manage pods containing services. For example, each geographic region 104a-c contains one or more pods in which one or more services are instantiated. In a one-pod-per-service implementation, a pod includes a single service. Alternatively, in a one-pod-per-multiple-services implementation, a pod includes multiple services and the orchestrator 108 manages all the services through the pod containing those services. In examples disclosed herein, the orchestrator 108 can migrate services between the geographic regions 104a-c when instructed to do so by the migration analyzer 102.

In the illustrated example, each of the geographic regions 104a-c includes a corresponding interaction counter, collectively referred to in FIG. 1 as example interaction counters 112. Each example geographic region 104a-c also includes a corresponding latency monitor, collectively referred to in FIG. 1 as example latency monitors 114. The example interaction counters 112 monitor for and count network communications including requests and/or any other interactions between services. The example interaction counters 112 provide interaction counts 116 to the migration analyzer 102 for use in generating migration recommendations of services to migrate between ones of the geographic regions 104a-c. In examples disclosed herein, an interaction can be a request made by a requesting service via a network communication to a serving service to cause the serving service to perform one or more operations and/or provide requested data to the requesting service. An example interaction can also be a network communication of data, status information, and/or any other information communicated between services. Such interactions can be inter-region interactions and/or intra-regions interactions. As used herein, inter-region interactions are communicated between different ones of the geographic regions 104a-c, and intra-region interactions are communicated within the same geographic region 104a-c. For example, an inter-region interaction is made by a service sending a network communication from its one of the geographic regions 104a-c to another service in a different one of the geographic regions 104a-c. In addition, an intra-region interaction is made by a service sending a network communication to another service within the same geographic region 104a-c.

In the illustrated example of FIG. 1, the interaction counters 112 may generate counts using application discovery provided by VMware vRealize® Operations Manager (VROPs) which is a software package that manages operations of virtualized and/or distributed services across physical environments, virtual environments, and cloud environments. Additionally or alternatively, the example interaction counters 112 may generate counts using OS-level commands such as netstat-tulpn, etc. to access network logs in containers and/or VMs in which received interactions are logged. To monitor interactions between containerized services, the example interaction counters 112 can be implemented in sidecar containers running in pods of the different geographic regions 104a-c to monitor container-level network interactions in federated clusters of containerized services deployed across those geographic regions 104a-c. A sidecar container deployed in a pod is a small, low-resource-consuming container configured to perform limited functionality for a particular purpose, sometimes to enhance operations of one or more corresponding main containers of that same pod. To log interaction counts, the interaction counters 112 monitor network communications received in containers, along with source details. Source details may include a source identifier (e.g., an internet protocol (IP) address or other network identifier, hardware identifier, etc.) of a source service. To monitor interactions between VM-based services, the example interaction counters 112 can be implemented in VM-based services running in VMs alongside other VM-based services for which interactions are monitored. In the illustrated example, the interaction counters 112 generate example interaction counts 116 of corresponding services based on the collected interaction data by aggregating counts of network interactions corresponding to those services for corresponding time periods. Times and durations of such time periods are configurable by a user. An example data structure of the interaction counts 116 is shown in FIG. 2 which shows each logged interaction count in association with a network source and a network destination. The example migration analyzer 102 can poll the interaction counters 112 for the interaction counts 116 at predefined and/or dynamically defined time intervals to obtain counts of interactions that occurred during a time frame.

The example latency monitors 114 monitor real-time latencies between the geographic regions 104a-c. The example latency monitors 114 provide latency logs 118 to the migration analyzer 102 for use in generating migration recommendations of services to migrate between ones of the geographic regions 104a-c. As used herein, latency is the amount of time that elapses between a first point in time when a service sends a network communication and a subsequent, second point in time when another service receives the network communication. In examples disclosed herein, the latency monitors 114 monitor and log latencies of inter-region network connections (e.g., inter-region latencies of network connections between the geographic regions 104a-c). The example latency monitors 114 can calculate latencies by determining differences between send timestamps and receive timestamps of network communications between the geographic regions 104a-c. The example latency monitors 114 may be deployed as small microscopic pods in the geographic regions 104a-c. The example migration analyzer 102 can use the latencies of inter-region network connections to generate recommendations for migrating services between ones of the geographic regions 104a-c to decrease latency. In examples disclosed herein, the latency monitors 114 need not monitor latencies of intra-region network connections (e.g., intra-region latencies of network connections in the same geographic region 104a-c) because such intra-region latencies can be regarded as negligible when recommending migrations of services between ones of the geographic regions 104a-c. However, in other implementations, the latency monitors 114 may be configured to log intra-region latencies.

The migration analyzer 102 of the illustrated example of FIG. 1 includes an example interaction count collector 122, an example latency collector 124, an example graph generator 126, an example weighing engine, 128 an example recommendation engine 130, and an example migrator 132. The example interaction count collector 122 collects the interaction counts 116 from the interaction counters 112. For example, the interaction count collector 122 collects a count of interactions between a first service in the first geographic region 104a and a second service in the second geographic region 104b. Similarly, by collecting the interaction counts 116, the interaction count collector 122 collects counts of inter-region interactions between other services in different geographic regions 104a-c and/or collects counts of intra-region interactions between services within the same geographic region. The example interaction count collector 122 can poll the interaction counters 112 for the interaction counts 116 at predefined and/or dynamically defined time intervals to obtain counts of interactions that occurred during a time frame.

The example latency collector 124 collects the latency logs 118 from the latency monitors 114. For example, the latency collector 124 collects latency values of real-time latency between a first service in the first geographic region 104a and a second service in the second geographic region 104b. Similarly, by collecting the latency logs 118, the latency collector 124 collects latency values of real-time latencies between other services in different geographic regions 104a-c. In examples disclosed herein, the latency logs 118 include latency values for inter-region real-time latencies (e.g., latencies of network communications between the geographic regions 104a-c) but not for intra-region latencies (e.g., latencies of network communications in the same geographic region 104a-c) because intra-region latencies are considered negligible or not relevant to recommending migrations of services between the geographic regions 104a-c. However, in other implementations, the latency monitors 114 may also log intra-region real-time latencies in the latency logs 118. The example latency collector 124 can poll the latency monitors 114 for the latency logs 118 at predefined and/or dynamically defined time intervals to obtain counts of interactions that occurred during a time frame.

The example migration analyzer 102 is provided with the graph generator 126 to generate an example interaction graph 134. In the illustrated example of FIG. 1, the graph generator 126 generates the interaction graph 134 based on the interaction counts 116 and the latency logs 118. The example interaction graph 134 includes nodes representing services, and edges between the nodes to represent network paths of network communications implementing interactions between the services. For example, a first node of the interaction graph 134 can represent a first service in the first geographic region 104a, and a second node of the interaction graph 134 can represent a second service of the second geographic region 104b. An edge between the first and second nodes is representative of a network path of interactions between the first and second services. In some examples, the edge can be identified with a direction of interaction to indicate the source node and the destination node. For example, the source node represents the source service that originated an interaction, and the destination node represents the destination service that receives the interaction. In the illustrated example of FIG. 1, the interaction graph 134 is an acyclic graph in that the graph 134 does not include backward loops between nodes.

The example migration analyzer 102 is provided with the weighing engine 128 to determine edge weight values of edges between nodes of the interaction graph 134 representing corresponding services. The example weighing engine 128 generates the edge weight values based on the interaction counts 116 and the latency logs 118. For example, the weighing engine 128 can determine a weight of an edge between a first service in the first geographic region 104a and a second service in the second geographic region 104b based on a count of interactions for that edge in the interaction counts 116 and based on a latency value of a latency for that edge (e.g., a real-time latency in the latency logs 118 or a smoothened latency based on multiple real-time latencies in the latency logs 118). As such, the edge weight value of the edge represents a total latency between the two services (e.g., represented as two nodes in the interaction graph 134) taking into account the number of interactions on that edge and the latency of the edge. The example weighing engine 128 stores the edge weight values in association with corresponding edges of the interaction graph 134 for subsequent analysis by the recommendation engine 130 and/or by a user to overcome slow deployment performance. For example, the weighing engine 128 can store the edge weight values in a data structure, a data array, in records, etc. in any suitable manner that associates the edge weight values with the corresponding edges. In some examples, the graph generator 126 can provide the interaction graph 134 and associated edge weight values to a display interface to present that information via, for example, a graphical user interface (GUI) on a display for analysis by a user (e.g., a user may analyze the flow and network communication performance between services). As such, the example interaction graph 134 provides users with the application flow between the services within same geographic regions 104a-c and between different geographic regions 104a-c.

The example migration analyzer 102 is provided with the recommendation engine 130 to generate migration recommendations to migrate services between the geographic regions 104a-c based on the interaction graph 134 and edge weight values of edges between the nodes of the interaction graph 134. For example, the recommendation engine 130 can generate a migration recommendation to migrate a service from the first geographic region 104a to the second geographic region 104b based on an edge weight value of an edge between the service in the first geographic region 104a and another service in the second geographic region 104b. The example recommendation engine 130 may be implemented as part of network virtualization services (e.g., VMware vRealize® Network Insight).

In the illustrated example, to make recommendations for multiple migrations, the recommendation engine 130 uses the interaction graph 134 to recommend a list of pod migrations across the geographic regions 104a-c that would reduce an overall latency of the multi-region distributed computing environment 106, without needing to introduce replications of services. In the example of FIG. 1, migration recommendations generated by the recommendation engine 130 are shown in an example migration recommendation table 138. The example migration recommendation table 138 identifies services to be migrated (e.g., MOVE=APP2), identifies the geographic region 104a-c from which the service will be migrated (e.g., FROM=REGION4), identifies the geographic region 104a-c to which the service will be migrated (e.g., TO=REGION1), includes the cost savings per year that can be achieved for a migration (e.g., COST SAVING/YR=$1500), and indicates the speed increase that can be achieved for the migration (e.g., SPEED INCREASE=140 ms (milliseconds)). The example recommendation engine 130 can provide the migration recommendation table 138 to a display interface to present that information via, for example, a GUI on a display for analysis by a user. The user can select one or more of the migration recommendations for implementation.

The example migration analyzer 102 is provided with the migrator 132 to migrate services between ones of the geographic regions 104a-c. For example, based on user selections of ones of the migration recommendations from the migration recommendation table 138, the migrator 132 provides the selected migrations to the orchestrator 108 to implement the migrations. By generating migration recommendations and implementing selected ones of the migration recommendations, the migration analyzer 102 overcomes the problem of high deployment costs and improves application throughput by decreasing latencies.

Figures 3, 4:
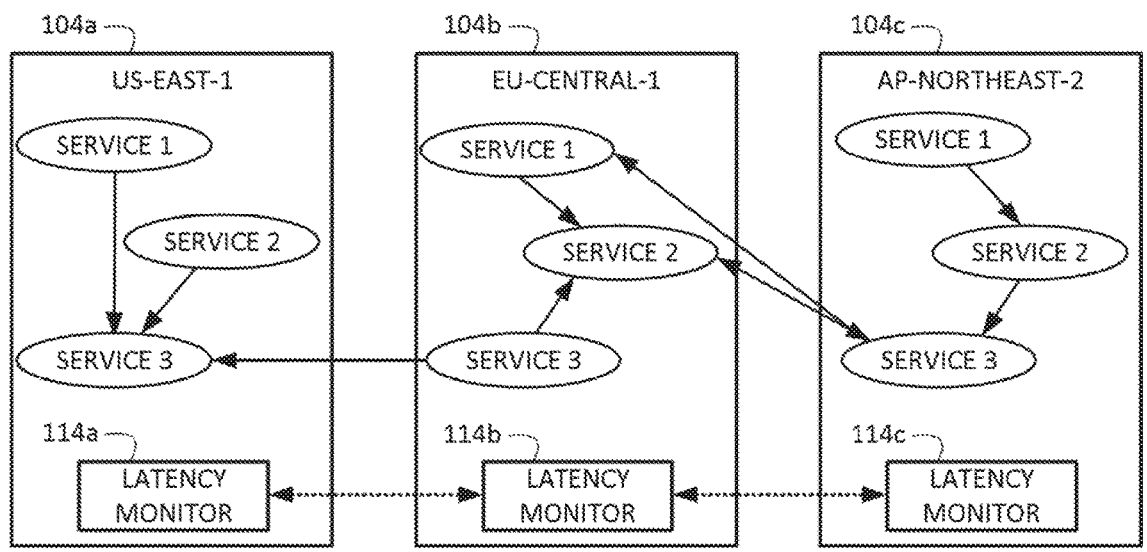
FIG. 3 depicts example latency monitors of FIG. 1 to monitor real-time latencies of network communications between the geographic regions of FIG. 1.
FIG. 4 is an example smoothened latency records table including smoothened latency values generated based on latency logs of FIG. 1.

FIG. 3 depicts the example latency monitors 114 of FIG. 1 to monitor real-time latencies of network communications between the geographic regions 104a-c of FIG. 1. The example latency monitors 114 are shown as latency monitor 114a in the first geographic region 104a, latency monitor 114b in the second geographic region, and latency monitor 114c in the third geographic region. The example of FIG. 3 shows three services per each geographic regions 104a-c. The services are labeled "Service 1," "Service 2," and "Service 3." These services form a federated cluster of services that are part of the same application and managed across the geographic regions 104a-c by the orchestrator 108. As shown in the example of FIG. 3, inter-region network interactions are sent between ones of the services across the geographic regions 104a-c. In this manner, the federated cluster of services can work cooperatively to implement their application across the geographic regions 104a-c. The example latency monitors 114 provide near real-time latency details between the geographic regions 104a-c for a federated cluster of services deployed across the geographic regions 104a-c. In some examples, this is done by running one or more small, low-resource-consuming containers (e.g., sidecar containers) in each geographic region 104a-c of a federated cluster of containerized services and/or one or more low-resource-consuming VM-based services in each geographic region 104a-c. The example latency monitors 114 continuously ping latency monitors 114 in other geographic regions 104a-c and obtain time series data of real-time latencies between the geographic regions. Such time series data can be elapsed times between send timestamps and corresponding receipt timestamps of network interactions. The example latency monitors 114 store the time series data as latency values in the latency logs 118.

In some instances, latency values in the latency logs 118 generated by the latency monitors 114 can be inaccurate due to various reasons such as intermittent network issues, peak load times, etc. In examples disclosed herein, in addition to collecting the latency logs 118, the latency collector 124 may also enhance the latency values in the latency logs 118. For example, to enhance accuracies of latency values, the example latency collector 124 of FIG. 1 smoothens the latency values provided in the latency logs 118 by the latency monitors 114 (e.g., using exponential smoothing). This reduces the sensitivity of the results towards incoherent value(s) (e.g., significant outliers or significantly inaccurate latencies), and produces more accurate results based on past histories of latencies. To smoothen the latency values, the latency collector 124 can use Equations 1 and 2 below.

$$\text{Smoothened Latency}_t = (\alpha) * \text{Latency}_t + (1-\alpha) * \text{Moving Average}_{n,t} \quad \text{Equation 1}$$

where $0 \leq \alpha \leq 1$ and, $$\text{Moving Average}_{n,t} = \Sigma_{t-n-1}^{t-1} \text{Latency}_t / n \quad \text{Equation 2}$$

In Equation 1 above, the smoothened latency for a time duration (t) (Smoothened Latency$_t$) is equal to a product of an alpha parameter value ($\alpha$) and a raw latency for the time duration (t) (Latency$_t$) (e.g., from the latency logs 118) added to a product of a moving average (Moving Average$_{n,t}$) of a number (n) of historical raw latency values for the time duration (t) and a difference value of one subtracted from the alpha parameter value ($\alpha$) (e.g., (1−$\alpha$)). To obtain a smoothened latency (e.g., to be used by the weighing engine 128), Equation 2 above is used to obtain a moving average of a number (n) of historical raw latency values. In some examples, the number (n) of historical raw latency values is selected based on heuristics. The example latency collector 124 may store smoothened latency values in a data structure such as an example smoothened latency records table 400 shown in FIG. 4. In the example smoothened latency records table 400, smoothened latency values (e.g., 23.56 ms, 26.55 ms, 56.23 ms) are stored in association with source geographic regions (e.g., in a FROM column) and destination geographic regions (e.g., in a TO column).

In Equation 1 above, the alpha parameter (α) is an exponential fraction (e.g., a value defined as 0≤α≤1), or exponential smoothing value, representing how much a raw latency value affects an output. The value of the alpha parameter value (α) can be selected using factors such as standard deviation based on the kind of input data. The value of the alpha parameter (α) indicates the weight given to a current raw latency value, relative to a moving average value of previous latency data, for the calculation of the smoothened latency value. Higher values of the alpha parameter (α) mean a higher reliance on the current value such that the current value will have a greater effect on the final resulting smoothened latency value. In examples disclosed herein, the alpha parameter (α) is determined by considering multiple parameters such as network peak loads, discrepancies in the data, identifications of trends and seasonality, etc. In examples disclosed herein, the alpha parameter (α) is assigned a low value (e.g., around 0.2-0.3), so that the final resulting smoothened latency value is more influenced by past data, and any anomalies, network peak loads, etc. will be averaged out. In some examples, the alpha parameter (α) is set equal to 0.2. In case the data is homogeneous, with not many missing values, the alpha parameter (α) can be set to a higher value.

In some examples, to further optimize the alpha parameter (α) value, the example migration analyzer 102 can use the value concept of supervised learning. For example, the migration analyzer 102 can use a training dataset, with possible optimizations included, to run the migration recommendation algorithm as described below with different values of the alpha parameter (α). For example, the latency collector 124 can select different values for the alpha parameter (α), and the recommendation engine 130 can run the migration recommendation algorithm based on an input training dataset. The latency collector 124 can select the alpha parameter (α) value that results in the migration recommendations closest and most similar to the input training dataset. The example latency collector 124 can use the selected alpha parameter (α) value to determine smoothened latency values using Equations 1 and 2 above.

Figure 5:
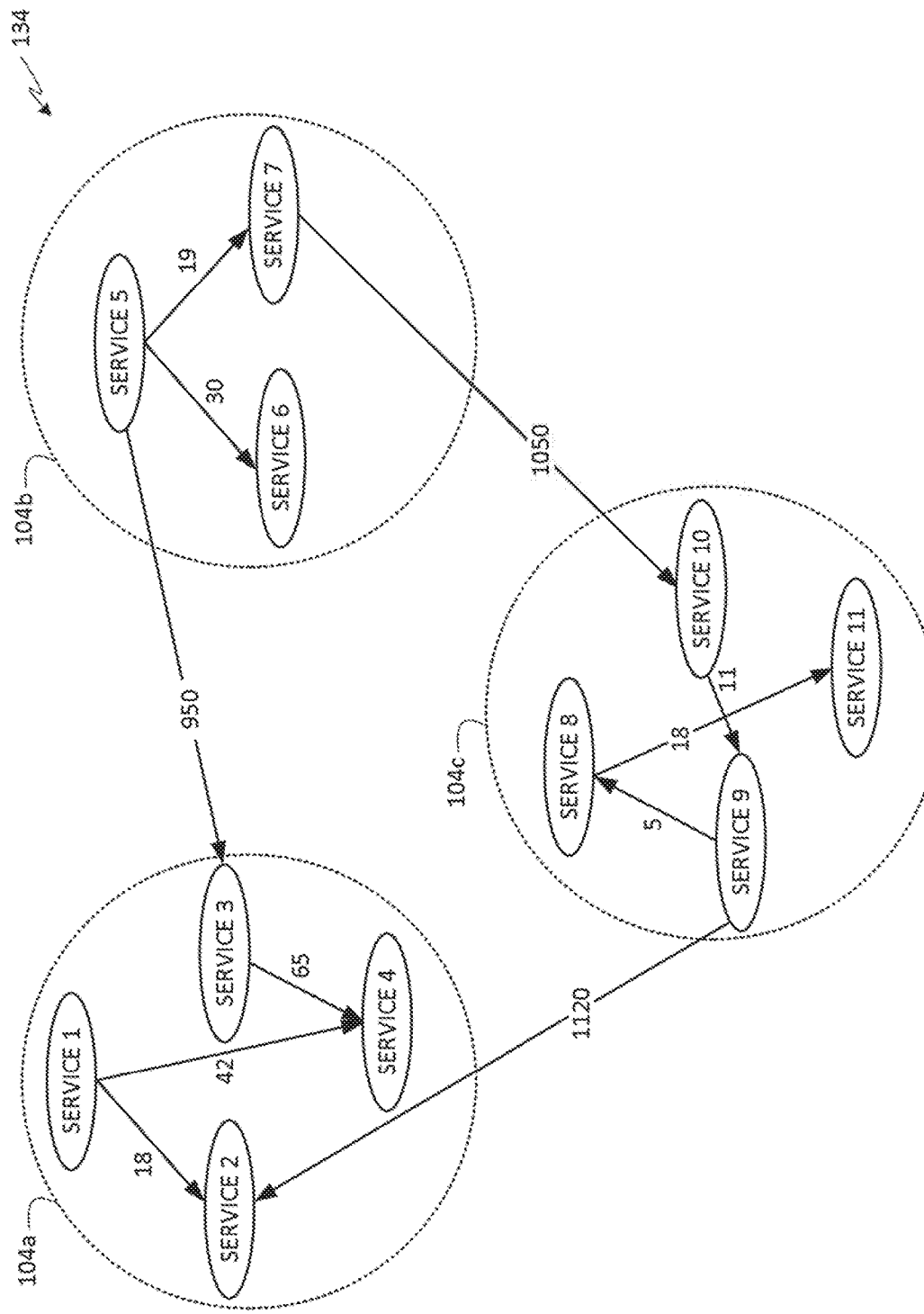
FIG. 5 is an example interaction graph corresponding to FIG. 1 that includes edge weight values at edges between nodes representing services in the geographic regions of FIGS. 1 and 3.

FIG. 5 is the example interaction graph 134 of FIG. 1 that includes edge weight values at corresponding edges between nodes representing services in the geographic regions 104a-c of FIGS. 1 and 3. In the example of FIG. 5, the nodes (e.g., vertices) represent services enumerated as Services 1-11. The example services are part of a federated cluster to implement an application across the geographic regions 104a-c. Also in the example of FIG. 5, each edge between two nodes represents a network path of interactions (e.g., requests) between the services of those nodes. Edge weight values shown at edges between nodes are determined as described in detail below. Edge weight values shown at edges of FIG. 5 between nodes in the same geographic region 104a-c are intra-region edge weight values. Edge weight values shown at edges of FIG. 5 between nodes in different geographic regions 104a-c are inter-region edge weight values. In the example of FIG. 5, an intra-region edge weight value between Service 1 and Service 2 in FIG. 5 is equal to 15, and an inter-region edge weight value between Service 3 and Service 5 in FIG. 5 is equal to 950.

In connection with the example of FIG. 5, inputs to the weighing engine 128 are the interaction counts 116 and the smoothened inter-region network latency values determined by the latency calculator 124 as described above in connection with Equations 1 and 2 and FIGS. 3 and 4. The example graph generator 126 generates the interaction graph 134 as a network topology graph that represents the interaction flows of the services and the costs of those interactions in terms of network latency. In some examples, the graph generator 126 can exclude from the interaction graph 134 services that are explicitly specified by a user to be ignored for optimization.

In examples disclosed herein, inter-region edge weight values of edges between services in different geographic regions 104a-c represent total network latency for all interactions during a specified duration between the two services. In examples disclosed herein, intra-region edge weight values of edges between services in the same geographic region 104a-c represent a total count of interactions during a specified duration between the two services. The example weighing engine 128 can use Equation 3 below to determine both inter-region edge weight values and intra-region edge weight values.

$$W_{ij} = \begin{cases} C_{ij} * \partial_{xy}, & x \neq y \\ C_{ij}, & x = y \end{cases} \quad \text{Equation 3}$$

In Equation 3 above, service indices (i) and (j) represent separate services, and region identifiers (x) and (y) represent ones of the geographic regions 104a-c. In the example of Equation 3, service index (i) is in the geographic region identified by (x) (e.g., i∈region x), and service index (j) is in the geographic region identified by (y) (e.g., j∈region y). Also in Equation 3 above, the edge weight value ($W_{ij}$) between nodes (also referred to herein as vertices) representing services (i) and U) is calculated based on a latency ($\partial_{xy}$) between geographic regions (x) and (y) (e.g., from the smoothened latency records table 400 of FIG. 4) and/or based on a count of interactions ($C_{ij}$) between the services (i) and (j) (e.g., from the interaction counts 116). In particular, to determine an edge weight value ($W_{ij}$) that is an inter-region edge weight value in which the geographic regions (x) and (y) are not the same (x≠y), the weighing engine 128 multiplies the count of interactions ($C_{ij}$) by a corresponding smoothened latency ($\partial_{xy}$) between the services (i) and (j) across the different geographic regions (x) and (y). To determine an edge weight value ($W_{ij}$) that is an intra-region edge weight value in which the geographic regions (x) and (y) are the same (x=y), the weighing engine 128 sets the edge weight value ($W_{ij}$) equal to the count of interactions ($C_{ij}$) between the services (i) and (j) in the same geographic region. In other words, for intra-region edge weight values, intra-region latency values ($\partial_{xy}$) are regarded as having a value of one (e.g., not impactful to an intra-region edge weight value) as they are negligible for purposes of generating migration recommendations for inter-region service migrations. Thus, edge weight values ($W_{ij}$) between services in the same geographic region can be regarded as a baseline performance of interactions between those services when latency is not a significant factor. In examples disclosed herein, the edge weight value ($W_{ij}$) is expressed in milliseconds.

The example graph generator 126 (FIG. 1) associates the edge weight values ($W_{ij}$) determined by the weighing engine 128 with corresponding edges as shown in the interaction graph 134 of FIG. 5. The example recommendation engine 130 (FIG. 1) uses the edge weight values ($W_{ij}$) of the interaction graph 134 to recommend service migrations of ones of the services between the geographic regions 104a-c. For example, for the example interaction graph 134 shown in FIG. 5, the weighing engine 128 determines an inter-region edge weight value ($W_{ij}$) between Service 2 and Service 9 to be 1120 ms by multiplying 10 interactions (e.g., count of interactions ($C_{ij}$)=10) by 112 ms of latency (e.g., smoothened latency ($\partial_{xy}$)=112 ms). The example weighing engine 128 determines an inter-region edge weight value ($W_{ij}$) between Service 7 and Service 10 to be 1050 ms by multiplying 21 interactions (e.g., count of interactions ($C_{ij}$)=21) by 50 ms (e.g., smoothened latency ($\partial_{xy}$)=50 ms). The example weighing engine 128 determines an inter-region edge weight value ($W_{ij}$) between Service 3 and Service 5 to be 95 ms by multiplying 10 interactions (e.g., count of interactions ($C_{ij}$)=10) by 95 ms (e.g., smoothened latency ($\partial_{xy}$)=95 ms). Based on these inter-region edge weight values ($W_{ij}$), the example recommendation engine 130 generates a migration recommendation to migrate Service 10 from the third geographic region 104c to the second geographic region 104b.

The reason for the migration recommendation of the above example is that migrating Service 10 to the second geographic region 104b decreases the inter-region edge weight value ($W_{ij}$) between the third geographic region 104c and the second geographic region 104b because a resulting post-migration inter-region edge weight value ($W_{ij}$) of the network path between Service 10 in the second geographic region 104b and Service 9 in the third geographic region 104c is 550 ms which is determined by multiplying 11 interactions (e.g., count of interactions ($C_{ij}$)=11 between Service 9 and Service 10) by 50 ms (e.g., smoothened latency ($\partial_{xy}$)=50 ms between the third geographic region 104c and the second geographic region 104b). Thus, migrating Service 10 from the third geographic region 104c to the second geographic region 104b can be recommended because the resulting post-migration inter-region edge weight value ($W_{ij}$) of 550 ms between the third geographic region 104c and the second geographic region 104b is less than the pre-migration inter-region edge weight value ($W_{ij}$) of 1050 ms between the third geographic region 104c and the second geographic region 104b. However, the recommendation engine 130 would not generate a migration recommendation to migrate Service 2 from the first geographic region 104a to the third geographic region 104c because such a migration would increase the inter-region edge weight value ($W_{ij}$) between the third geographic region 104c and the first geographic region 104a. That is, the resulting post-migration inter-region edge weight value ($W_{ij}$) of the network path between Service 2 in the third geographic region 104c and Service 1 in the first geographic region 104a is 2016 ms which is determined by multiplying 18 interactions (e.g., count of interactions ($C_{ij}$)=18 between Service 1 and Service 2) by 112 ms (e.g., smoothened latency ($\partial_{xy}$)=112 ms between the third geographic region 104c and the first geographic region 104a). Thus, migrating Service 2 from the first geographic region 104a to the third geographic region 104c is not recommended because the resulting post-migration inter-region edge weight value ($W_{ij}$) of 2016 ms between the third geographic region 104c and the first geographic region 104a is greater than the pre-migration inter-region edge weight value ($W_{ij}$) of 1120 ms between the third geographic region 104c and the first geographic region 104a.

In addition, the above migration recommendation example decreases a global latency corresponding to the combined inter-region latencies represented by the inter-region edge weight value ($W_{ij}$) of network paths between the geographic regions 104a-c. For example, in FIG. 5, the pre-migration inter-region edge weight values ($W_{ij}$) between the geographic regions 104a-c before migrating Service 10 to the second geographic region 104b is 3120 ms (e.g., 950+1120+1050), and the post-migration inter-region edge weight values ($W_{ij}$) between the geographic regions 104a-c after migrating Service 10 to the second geographic region 104b is 2620 ms (e.g., 950+1120+550). In this migration example, migrating Service 10 to the second geographic region 104b reduces the global latency by 500 ms. That is, a global latency factor change can be determined by subtracting the post-migration inter-region edge weight values ($W_{ij}$) from the pre-migration inter-region edge weight values ($W_{ij}$) (e.g., pre-migration inter-region edge weight values ($W_{ij}$)—post-migration inter-region edge weight values ($W_{ij}$)=global latency factor change) which in the above example results in a global latency factor change of 500 ms (e.g., 3120 ms−2620 ms=500 ms). By determining changes in global latency through a global latency factor change, examples disclosed herein can be used to determine migration recommendations based on the impact that possible migrations would have on the global latency of multi-region distributed computing environments having interactions between only between two geographic regions, interactions between more than two geographic regions, and/or having a service in one geographic region that interacts with services in multiple other geographic regions. Additional examples of using global latency to determine global latency factor change for use in determining migration recommendations are described below in connection with FIG. 8.

While an example manner of implementing the migration analyzer 102 is illustrated in FIG. 1, one or more of the elements, processes and/or devices illustrated in FIG. 1 may be combined, divided, re-arranged, omitted, eliminated and/or implemented in any other way. Further, the example interaction count collector 122, the example latency collector 124, the example graph generator 126, the example weighing engine, 128 the example recommendation engine 130, the example migrator 132 and/or, more generally, the example migration analyzer 102 of FIG. 1, and/or the example interaction counters 112, the example latency monitors 114, and/or the example orchestrator 108 of FIG. 1 may be implemented by hardware, software, firmware and/or any combination of hardware, software and/or firmware. Thus, for example, any of the example interaction count collector 122, the example latency collector 124, the example graph generator 126, the example weighing engine, 128 the example recommendation engine 130, the example migrator 132 and/or, more generally, the example migration analyzer 102, and/or the example interaction counters 112, the example latency monitors 114, and/or the example orchestrator 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interaction count collector 122, the example latency collector 124, the example graph generator 126, the example weighing engine, 128 the example recommendation engine 130, the example migrator 132, the example interaction counters 112, the example latency monitors 114, and/or the example orchestrator 108 is/are hereby expressly defined to include a non-transitory computer readable storage device or storage disk such as a memory, a digital versatile disk (DVD), a compact disk (CD), a Blu-ray disk, etc. including the software and/or firmware. Further still, the example migration analyzer 102 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In examples disclosed herein, the example graph generator 126 may implement means for generating an interaction graph. In examples disclosed herein, the example weighing engine 128 may implement means for determining an weight value of an edge (e.g., an edge weight value). In examples disclosed herein, the example recommendation engine 130 may implement means for generating a migration recommendation. In examples disclosed herein, the example count collector 122 may implement means for collecting a count of network interactions. In examples disclosed herein, the example latency collector 124 may implement means for collecting real-time latencies.

Figure 6:
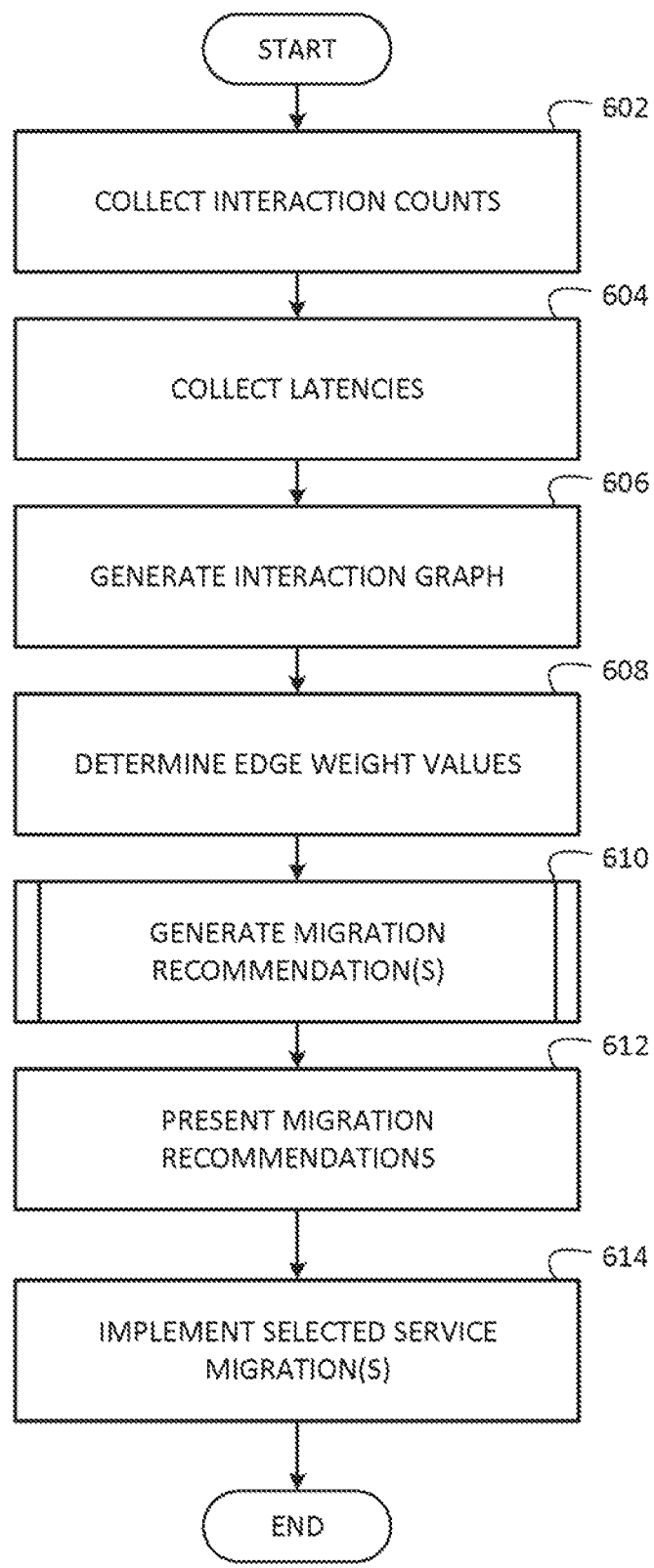
FIG. 6 is a flowchart representative of example machine-readable instructions that may be executed to implement the migration analyzer of FIG. 1 to generate migration recommendations to migrate services between geographic regions.
Figure 7:
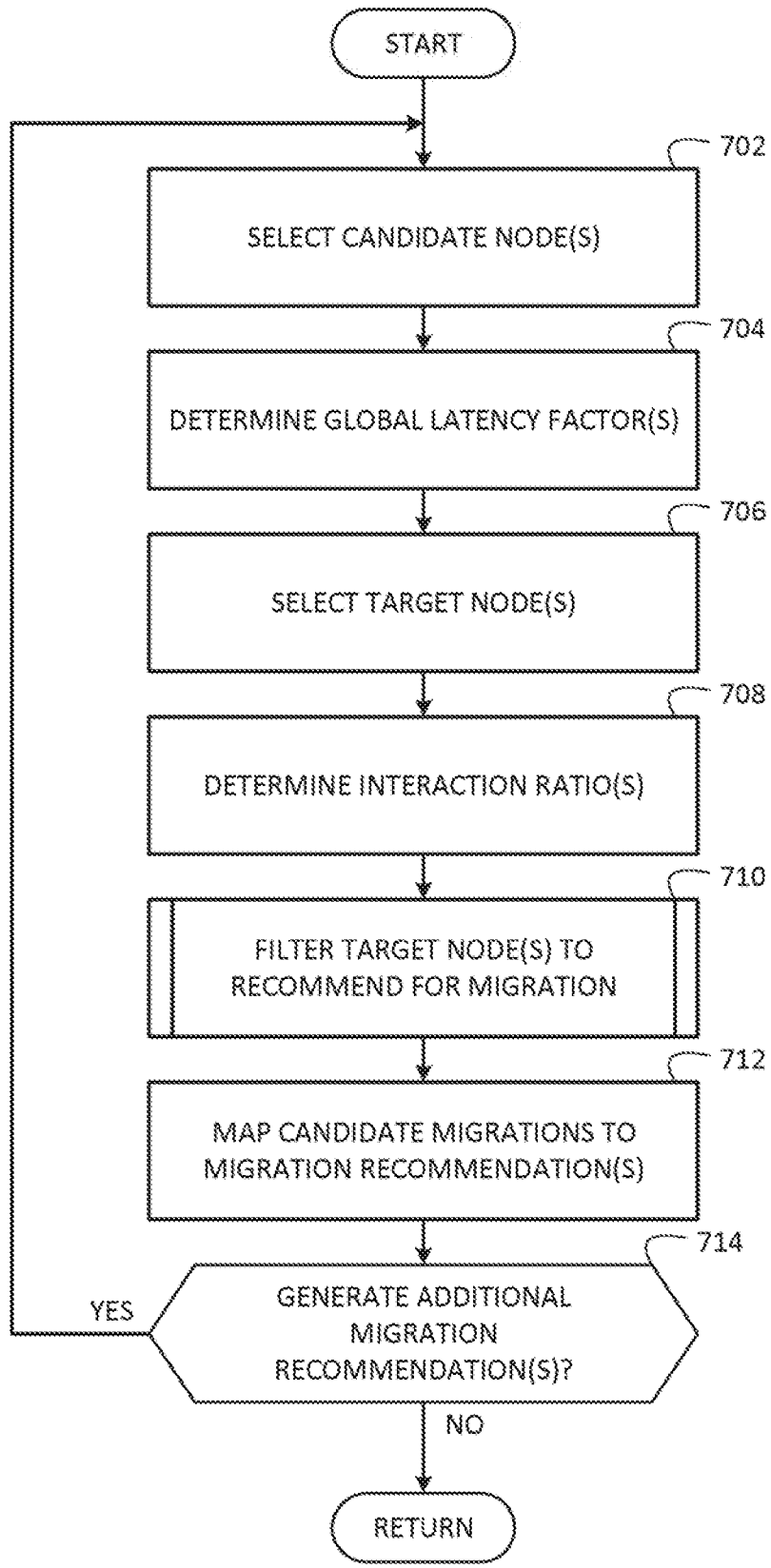
FIG. 7 is a flowchart representative of example machine-readable instructions that may be executed to implement a recommendation engine of FIG. 1 to generate migration recommendations to migrate services between geographic regions.
Figure 8:
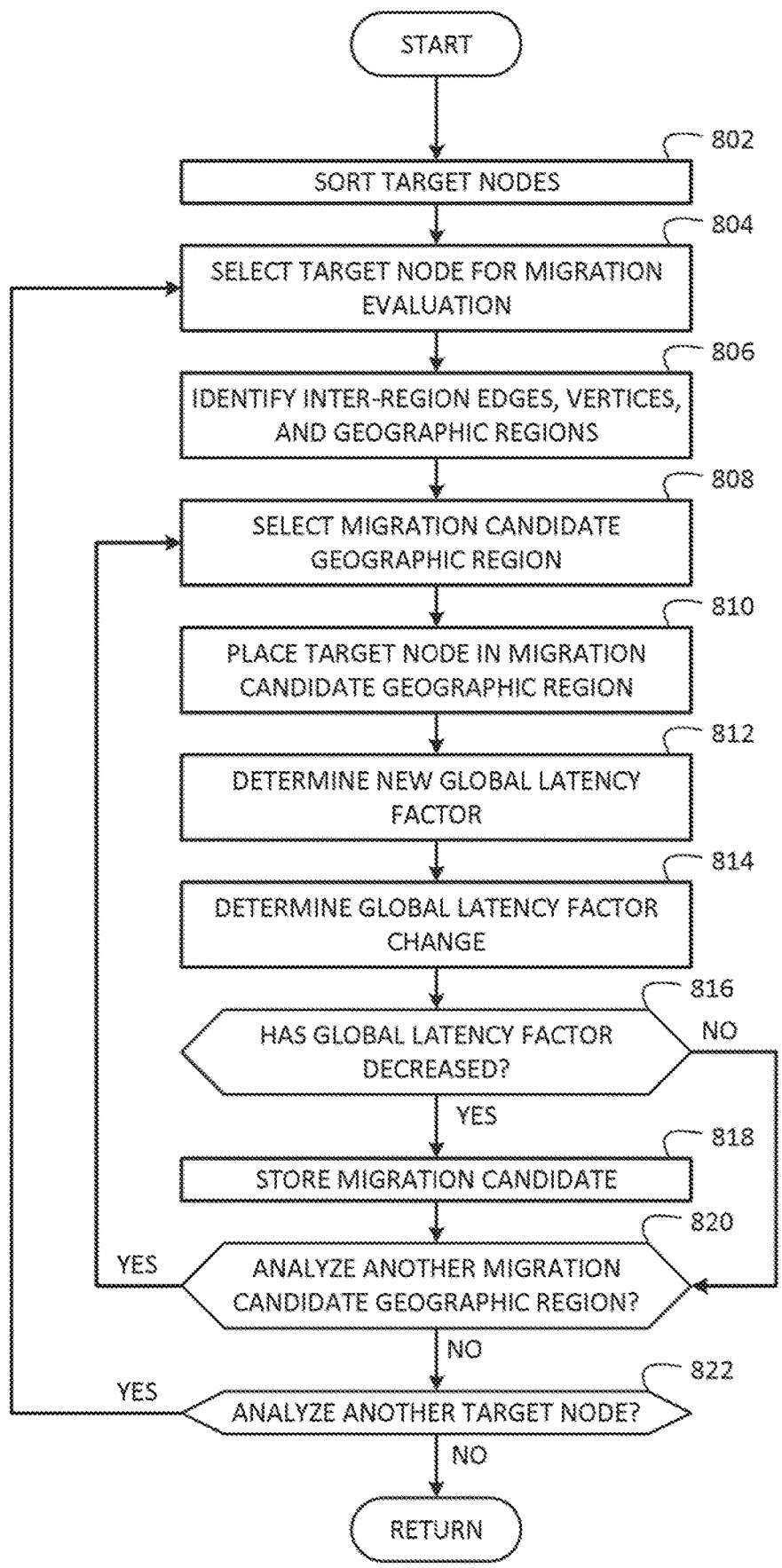
FIG. 8 is a flowchart representative of example machine-readable instructions that may be executed to implement the recommendation engine of FIG. 1 to filter target nodes to recommend for migration.

Flowcharts representative of example hardware logic, machine-readable instructions, hardware implemented state machines, and/or any combination thereof for implementing the migration analyzer 102 of FIG. 1 are shown in FIGS. 6-8. The machine-readable instructions may be one or more executable programs or portion(s) of an executable program for execution by a computer processor such as the processor 912 shown in the example processor platform 900 discussed below in connection with FIG. 9. The program(s) may be embodied in software stored on a non-transitory computer readable storage medium such as a CD-ROM, a floppy disk, a hard drive, a DVD, a Blu-ray disk, or a memory associated with the processor 912, but the entirety of the program(s) and/or parts thereof could alternatively be executed by a device other than the processor 912 and/or embodied in firmware or dedicated hardware. Further, although the example program(s) is/are described with reference to the flowcharts illustrated in FIGS. 6-8, many other methods of implementing the example migration analyzer 102 may alternatively be used. For example, the order of execution of the blocks may be changed, and/or some of the blocks described may be changed, eliminated, combined, and/or executed in parallel. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement one or more program(s) such as the program(s) disclosed herein.

In other examples, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In other examples, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions disclosed herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-8 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of example machine-readable instructions that may be executed to implement the migration analyzer 102 of FIG. 1 to generate migration recommendations to migrate services between the geographic regions 104a-c. The example program of FIG. 6 begins at block 602 at which the count collector 122 (FIG. 1) collects the interaction counts 116 (FIG. 1). For example, the count collector 122 collects a count of network interactions between a first service in a first geographic region 104a and a second service in a second geographic region 104b. The example latency collector 124 (FIG. 1) collects the latency logs 118 (FIG. 1) (block 604). For example, the latency collector 124 collects a real-time latency between the first and second services across the first geographic region 104a and the second geographic region 104b. The example graph generator 126 (FIG. 1) generates an interaction graph 134 (FIGS. 1 and 5) (block 606). For example, the graph generator 126 generates the interaction graph 134 to include nodes and edges therebetween. For example, a first one of the nodes is representative of the first service in the first geographic region 104a, a second one of the nodes is representative of the second service in the second geographic region 104b, and an edge between the first and second nodes is representative of a network path for interactions between first and second services represented by the first and second nodes.

The example weighing engine 128 (FIG. 1) determines edge weight values (block 608). For example, the weighing engine 128 can determine an edge weight value of the edge between the first and second services based on a count of network interactions collected at block 602 and a latency (e.g., a real-time latency collected at block 604 or a smoothened latency based on multiple real-time latencies collected at block 604). The example recommendation engine 130 (FIG. 1) generates one or more migration recommendations (block 610). For example, the recommendation engine 130 can generate a migration recommendation to migrate the first service to the second geographic region 104b from the first geographic region 104a based on the edge weight value of the edge between the first and second services. The generating of the migration recommendations of block 610 can be implemented by example machine-readable instructions represented by the flowchart of FIG. 7 as described in detail below.

The example recommendation engine 130 presents the migration recommendations (block 612). For example, the recommendation engine 130 may provide the migration recommendations to a display interface for displaying to a user in the form of a table (e.g., the migration recommendation table 138 of FIG. 1), as a graph (e.g., the interaction graph 134 of FIGS. 1 and 5), as words or sentences describing the recommended migration, and/or in any other suitable manner. For example, the displayed migration recommendations may include cost improvements and/or latency performance improvements corresponding to migrating services to different geographic regions. The example migrator 132 (FIG. 1) implements selected one(s) of the service migration(s) (block 614). For example, the migrator 132 may receive user selections specifying one or more of the recommended migrations to implement. Based on the user selections, the migrator 132 provides the selected migrations as migration requests to the orchestrator 108 (FIG. 1) to implement the migrations. The example program of FIG. 6 then ends. The example program of FIG. 6 (and/or FIG. 7 and/or FIG. 8) may be repeated any number of times to re-evaluate whether to make additional migration recommendations. For example, interaction counts, latencies, and/or performance requirements of services and/or distributed applications may change over time. As such, examples disclosed herein may be repeated multiple times to monitor services and re-evaluate when recommending migration(s) of any such service(s) may be beneficial.

FIG. 7 is a flowchart representative of example machine-readable instructions that may be executed to implement the example recommendation engine 130 of FIG. 1 to generate migration recommendations to migrate pods or services between the geographic regions 104a-c to reduce overall network latency. In some instances, the migration recommendations also result in cost savings if, after the migration, replications of one or more pods or services are no longer needed in multiple geographic regions 104a-c. The example instructions represented in FIG. 7 may be used to implement block 610 of FIG. 6.

The example program of FIG. 7 begins at block 702 at which the recommendation engine 130 selects or identifies one or more candidate nodes. For example, the recommendation engine can select candidate nodes representing services in the multi-region distributed computing environment 106 of FIG. 1. Candidate nodes are nodes in the multi-region distributed computing environment 106 that have at-least one non-zero weighted edge to a node in a geographic region 104a-c different than the geographic region 104a-c than it currently belongs (e.g., vertices of services that are interacting with at least one service in a different geographic region 104a-c). For example, in FIG. 5, vertices of Service 2, Service 3, Service 5, Service 7, Service 9, and Service 10 are selected by the recommendation engine 130 as target nodes.

The example recommendation engine 130 determines one or more global latency factors (block 704). For example, to determine a global latency factor for services (i) and (j) deployed in different geographic regions 104a-c, the recommendation engine 130 determines an inter-region node latency factor (S) for the services (i) and (j) using Equation 4, and determines the global latency factor ($S_G$) based on the inter-region node latency factor (S) using Equation 5 below.

$$S = \sum W_{ij} \quad \text{Equation 4}$$

$$S_G = \frac{\sum_{k=1}^{N} S_k}{2} \quad \text{Equation 5}$$

In Equation 4 above, the inter-region node latency factor (S) for a candidate node representing a service (i) in a first geographic region (e.g., the first geographic region 104a of FIGS. 1, 3, and 5) is equal to the sum of edge weight values ($W_{ij}$) for edges of that node which connect to a second node or vertex representing a second service (j) in a different geographic region (e.g., the second geographic region 104b of FIGS. 1, 3, and 5). That is, the recommendation engine 130 determines an inter-region node latency factor (S) for ones of the nodes in the interaction graph 134 (FIGS. 1 and 5) connected via inter-region edges to send/receive inter-region interactions. In Equation 5 above, the global latency factor ($S_G$) is equal to the sum of inter-region node latency factors ($S_k$) divided by two. In Equation 5, the sum of inter-region node latency factors ($S_k$) is for a total number of candidate nodes (N) having inter-region edges in the multi-region distributed computing environment 106. The global latency factor ($S_G$) denotes the overall network latency in the system due to inter-region interactions. Subsequent program instructions described below are performed to decrease the global latency factor ($S_G$) so that less time is spent on inter-region interactions.

The example recommendation engine 130 selects one or more target nodes (block 106). For example, the recommendation engine 130 determines the target node(s) based on interaction counts of two types of interactions between candidate nodes defined as "outdegree interaction counts" and "indegree interaction counts." As used herein, an outdegree interaction count is defined as a total count of interactions of a candidate node with nodes that are in different geographic regions 104a-c than the candidate node. As used herein, an indegree interaction count is defined as a total count of interactions of a candidate node with nodes that are in the same geographic region 104a-c as the candidate node. The example recommendation engine 130 can determine outdegree interaction counts ($O_k$) based on Equation 6 below, and can determine indegree interaction counts ($I_k$) based on Equation 7 below.

$$O_k = \Sigma C_{ij}[x \neq y] \quad \text{Equation 6}$$

$$I_k = \Sigma C_{ij}[x = y] \quad \text{Equation 7}$$

In the example Equations 6 and 7 above, service index (i) is in the geographic region identified by (x) (e.g., i∈region x), and service index (j) is in the geographic region identified by (y) (e.g., j∈region y). In Equation 6 above, the recommendation engine 130 determines the outdegree interaction counts ($O_k$) for a candidate node (k) as the sum of the count of interactions ($C_{ij}$) between the services (i) and (j). In Equation 7 above, the recommendation engine 130 determines the indegree interaction counts ($I_k$) for the candidate node (k) as the sum of the count of interactions ($C_{ij}$) between the services (i) and (j). The candidate node (k) represents the service (i), and the count of interactions ($C_{ij}$) between services (i) and (j) is obtained from the interaction counts 116 (FIG. 1).

If for a candidate node (k), the indegree interaction count ($I_k$) is greater than the outdegree interaction count ($O_k$) (e.g., $I_k > O_k$), the migration of that candidate node (k) to any geographic region 104a-c will not decrease the global latency factor ($S_G$), since this service is interacting more with the services in its current one of the geographic regions 104a-c, than with services in others of the geographic regions 104a-c combined. As such, the example recommendation engine 130 filters those candidate nodes (k) that have indegree interaction counts ($I_k$) less than outdegree interaction counts ($O_k$) (e.g., $I_k < O_k$). The example recommendation engine 130 selects the filtered candidate nodes (k) as the target nodes (T) defined according to Equation 8 below.

$$T \subseteq N \text{ such that } I_k < O_k \quad \text{Equation 8}$$

The example recommendation engine 130 determines one or more interaction ratios (block 708). For example, the recommendation engine 130 determines the one or more interaction ratios based on Equation 9 below for the target node(s) (T) selected at block 706.

$$\text{Interaction Ratio}_k = \frac{O_k}{I_k} \quad \text{Equation 9}$$

In Equation 9 above, the interaction ratio (Interaction Ratio$_k$) of a target node (T) is defined as the ratio of the outdegree interaction counts ($O_k$) to the indegree interaction counts ($I_k$). A higher interaction ratio (Interaction Ratio$_k$) is indicative of a better possibility of this target node being misplaced in its current geographic region 104a-c, as it has more inter-region network communications (interactions) than intra-region network communications (interactions). As such, the recommendation engine 130 can use the interaction ratio (Interaction Ratio$_k$) to select ones of the nodes that are preferred for further analysis for possible migration.

The example recommendation engine 130 filters ones of the target nodes (T) to recommend for migration (block 710). Filtering of the target nodes of block 410 can be implemented by example machine-readable instructions represented by the flowchart of FIG. 8 as described in detail below. The example recommendation engine 130 maps candidate migration(s) to one or more migration recommendations (block 712). For example, each candidate migration generated at block 710 maps to a recommendation, where the latency factor change is the total latency improvement, and the potential cost savings are the cost of running the service, computed as a share of resource requirements of the service relative to the cost of the underlying cluster infrastructure. An example migration recommendation can be worded for review by a user as "Moving pod/service X from region A to B will reduce the overall latency by Y milliseconds and potentially reduce the cost of replicating in both regions by $ Z." In some examples, multiple migration recommendations can be presented to a user so that a user can select which one or more of the recommendations to implement. In an example of potential costs savings, if a pod/service is allocated 4 GB of RAM and 2 virtual CPUs (vCPUs), and each cluster node on average has 16 GB RAM and 32 vCPUs, the average fraction of resources occupied by this pod/service is $$\frac{\left(\frac{4}{16} + \frac{2}{32}\right)}{2} = 15.625\%.$$

If the average cost of each node is $100/month, the cost of this pod/service is $15.625/month, which is the potential cost savings, if this pod/service is not replicated. For example, the pod/service is not replicated if its replication in a geographic region 104a-c is removed and migrated to a different geographic region 104a-c in which it is co-instantiated with another pod/service with which it interacts.

The example recommendation engine 130 determines whether to generate additional migration recommendations (block 714). If the recommendation engine 130 determines to generate additional migration recommendations, control returns to block 702. Otherwise, the example program of FIG. 7 ends, and control returns to a calling function or process such as the example program of FIG. 6. The instructions represented by the flowchart of FIG. 7 can be repeated until no significant decrease in global latency factor is detected. This optimization can also be run for a predefined number of times, or can be taken as an input from the user. These instructions generate a migration plan recommendation, which can be acted on if needed and/or desired.

If at the end of the candidate migration evaluation, the desired performance improvement is met, replicating some or all evaluated pods/services may be unnecessary. In some instances, replications of some pods/services might be needed based on user analysis of the network interaction graph 134 and associated migration recommendations. Examples disclosed herein can be used to achieve actual costs savings according to Equation 10 below through migrations of services between geographic regions 104a-c.

$$\text{actual cost savings=total cost of running services which need not be replicated anymore} \quad \text{Equation 10}$$

In some examples, the actual cost savings value can be presented via a computer display to a user for, for example, audit analysis, management, etc.

Turning now to FIG. 8, the example program represented by the flowchart of FIG. 8 may be used to implement block 710 of FIG. 7 to filter target nodes (T) to recommend for migration. The example program of FIG. 8 begins at block 802 at which the recommendation engine 130 sorts the target nodes (T). For example, the recommendation engine 130 sorts the target nodes (T) in descending order based on their interaction ratios (Interaction Ratio$_k$) determined at block 708 of FIG. 7. The example recommendation engine 130 selects a target node for migration evaluation (block 804). For the selected target node (T), the example recommendation engine 130 identifies its inter-region edges (e.g., out-degree-edges) (both directions), its corresponding vertices, and its geographic region 104a-c (block 806). For the selected target node (T), the example recommendation engine 130 selects a geographic region 104a-c as a migration candidate geographic region (block 808). A migration candidate geographic region is a geographic region to which the target node (T) can be migrated if the target node were migrated away from the geographic region 104a-c at which that target node (T) is currently located. In some examples, the selection of the migration candidate geographic region is random. In other examples, different migration candidate geographic regions are systematically selected for evaluation as migration targets until all geographic regions 104a-c (other than the current geographic region of the target node (T)) are evaluated.

The example recommendation engine 130 places the target node (T) in the selected migration candidate geographic region (block 810). Since the geographic region 104a-c for that target node (T) has changed, the interactions of the node are different. As such, the example recommendation engine 130 calculates a new global latency factor ($S_G$) (block 812) based on re-calculated edge weight values ($W_{ij}$) of the interaction graph 134 generated by the weighing engine 128 based on the changed geographic region 104a-c. The new global latency factor ($S_G$) is recalculated because if a target node (T) in the first geographic region 104a interacted with nodes in the second geographic region 104b and the third geographic region 104c, and the target node (T) is moved to the second geographic region 104b, the interactions corresponding to the node(s) in the third geographic region 104c will be with the target node (T) located in the second geographic region 104b instead of in the first geographic region 104a as originally deployed. In this manner, the example recommendation engine 130 can generate a candidate migration recommendation based on a latency improvement in the new global latency factor ($S_{G(new)}$) (e.g., determined based on the re-calculated edge weight value(s) ($W_{ij}$) and the target node (T) being in the second geographic region 104b) relative to the previous global latency factor ($S_{G(previous)}$) (e.g., determined based on the edge weight value(s) ($W_{ij}$) determined at block 608 and the target node (T) being in the first geographic region 104a).

The example recommendation engine 130 determines the global latency factor change between the previous global latency factor ($S_G$) and the new global latency factor ($S_G$) (block 814). For example, the recommendation engine 130 can determine the latency factor change based on Equation 11 below.

$$\text{global latency factor change}=S_{G(new)}-S_{G(previous)} \quad \text{Equation 11}$$

In Equation 11 above, the new global latency factor ($S_{G(new)}$) is subtracted from the previous global latency factor ($S_{G(previous)}$) to determine the global latency factor change. The example recommendation engine 130 determines whether the global latency factor has decreased (block 816). In the illustrated example, the minimum latency decrease (e.g., a threshold latency decrease value), represented by a minimum latency decrease parameter ($\varepsilon$), needed to perform the migration is defined in Equation 12 below.

$$\text{latency factor change}>\varepsilon \quad \text{Equation 12}$$

Based on Equation 12 above, a latency improvement needed to provide a corresponding migration recommendation is based on the latency factor change between the new global latency factor ($S_{G(new)}$) and the previous global latency factor ($S_{G(previous)}$) being greater than the minimum latency decrease parameter value ($\varepsilon$). By using the minimum latency decrease parameter ($\varepsilon$) criterion of Equation 12 above, migrations providing marginal improvement in latency performance are not recommended by the recommendation engine 130. The value of the minimum latency decrease ($\varepsilon$) can be selected based on heuristics. Alternatively or additionally, the minimum latency decrease ($\varepsilon$) can be specified by user input. For example, the user input may state "don't provide any migration recommendation unless it improves the latency by <minimum latency decrease> ms" in which the user input provides the value of the field <minimum latency decrease> for setting as the minimum latency decrease ($\varepsilon$).

If the global latency factor has decreased at block 816, the example recommendation engine 130 stores a migration candidate (block 818) in a migration candidates data structure based on the analysis of moving the target node (T) to the selected migration candidate geographic region. After storing the migration candidate at block 818, or if the global latency factor has not decreased at block 816, the example recommendation engine 130 determines whether there is another one of the geographic regions 104a-c to analyze as a migration candidate geographic region (block 820). If there is another migration candidate geographic region to analyze, control returns to block 808. Otherwise, the example recommendation engine 130 determines whether there is another target node (T) to analyze for possible migration (block 822). If there is another target node (T) to analyze, control returns to block 804. Otherwise, the example program of FIG. 8 ends, and control returns to a calling function or process such as the example program of FIG. 7.

Figure 9:
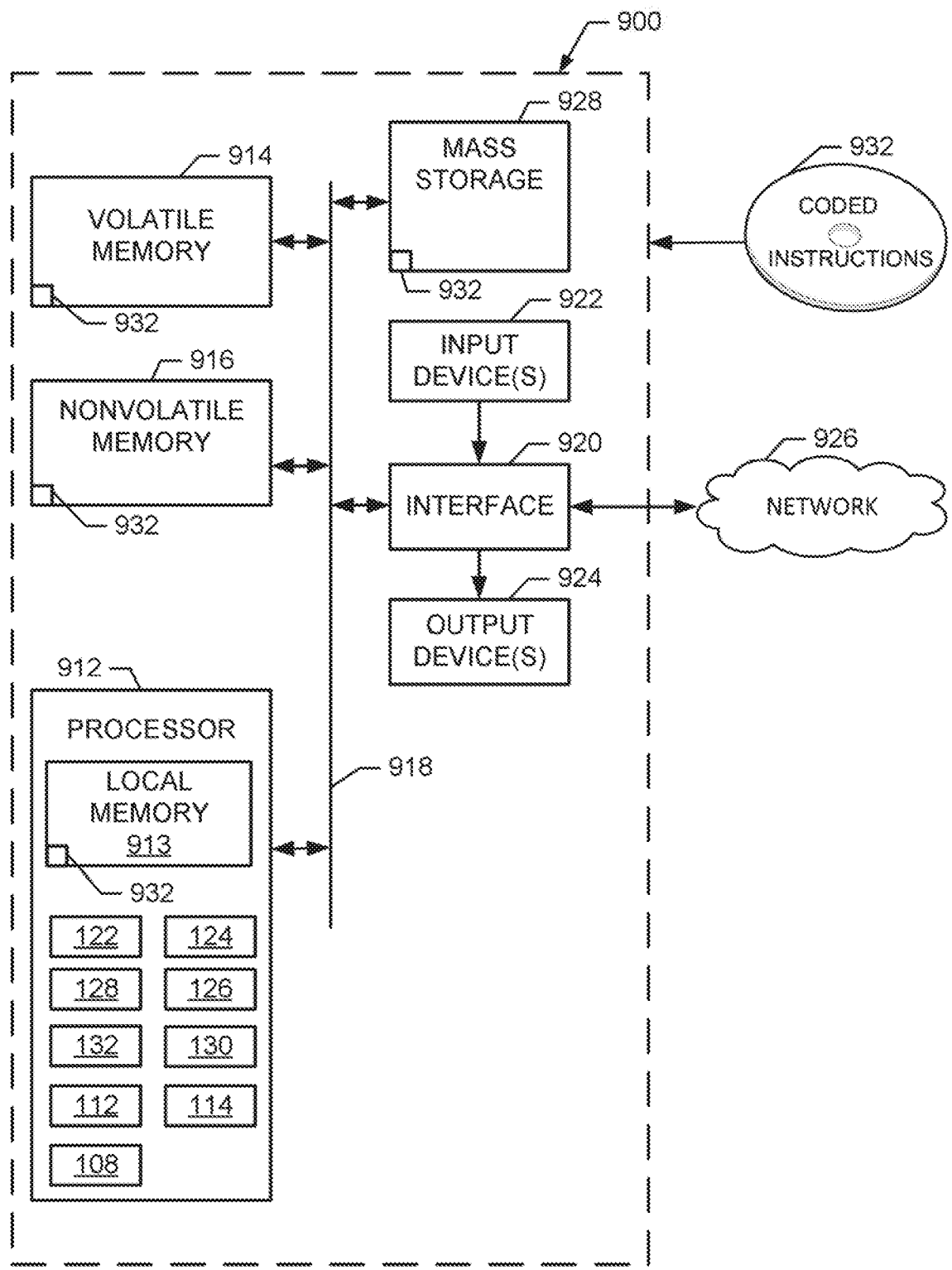
FIG. 9 is a block diagram of an example processing platform structured to execute the instructions of FIGS. 6-8 to implement the migration analyzer of FIG. 1.

FIG. 9 is a block diagram of an example processor platform 900 structured to execute the instructions of FIGS. 6-8 to implement the migration analyzer 102 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor 912 may be a semiconductor based (e.g., silicon based) device. In this example, the processor 912 implements the example interaction count collector 122, the example latency collector 124, the example graph generator 126, the example weighing engine, 128 the example recommendation engine 130, the example migrator 132, the example interaction counters 112, the example latency monitors 114, and the example orchestrator 108 of FIG. 1.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

Machine executable instructions 932 represented by the flowcharts of FIGS. 6-8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that generate migration recommendations to migrate services between geographic regions. Examples disclosed herein improve overall network latencies of cross-region distributed applications by generating migration recommendations that improve performance and cost of such distributed applications based on interaction counts and latencies between services. Examples disclosed herein facilitate implementing performance-improving and cost-improving migration by providing the generated migration recommendations to entities having the distributed applications. Migrating services in accordance with migration recommendations generated as disclosed herein reduces the overall time spent by communications between the various application components (e.g., pods). The migration recommendations also substantially reduce or eliminate the likelihood of running the same pod(s)/service(s) in multiple geographic regions in an effort to get desired performance improvement. That is, such performance improvements could instead be achieved by strategically migrating the pod(s)/service(s) across the geographic regions in accordance with migration recommendations generated as disclosed herein to reduce same-service replications across geographic regions. Based on migration recommendations generated in accordance with examples disclosed herein, a customer of distributed application services can be provided full flexibility in selecting applications as well as migrations of services between geographic regions to reduce service replications across the geographic regions.

Example methods, apparatus, systems, and articles of manufacture to generate migration recommendations to migrate services between geographic regions are disclosed herein. Further examples and combinations thereof include the following:

Example 1 includes an apparatus to determine a migration recommendation of a service between geographic regions, the apparatus including a graph generator to generate an interaction graph, the interaction graph including first and second nodes and an edge therebetween, the first node representative of a first service in a first geographic region, the second node representative of a second service in a second geographic region, and the edge representative of a network path of interactions between the first and second services, a weighing engine to determine a weight value of the edge between the first and second services based on a count of network interactions between the first and second services and a latency between the first and second services, and a recommendation engine to generate a migration recommendation to migrate the first service to the second geographic region based on the weight value of the edge.

Example 2 includes the apparatus of example 1, wherein the recommendation engine is to generate the migration recommendation based on a first global latency factor determined based on (a) the weight value, and (b) the first service being in the first geographic region, a second global latency factor determined based on (a) a second weight value, and (b) the first service being in the second geographic region, and a latency improvement in the second global latency factor relative to the first global latency factor.

Example 3 includes the apparatus of example 2, wherein the latency improvement is based on a latency factor change between the first and second global latency factors being greater than a threshold latency decrease value.

Example 4 includes the apparatus of example 1, further including a count collector to collect the count of network interactions between the first service in the first geographic region and the second service in the second geographic region.

Example 5 includes the apparatus of example 4, wherein the network interactions are monitored by sidecar containers monitoring network interactions and source details incoming to the first and second services.

Example 6 includes the apparatus of example 1, further including a latency collector to collect real-time latencies between the first and second services across the first and second geographic regions, the latency is based on the real-time latencies.

Example 7 includes the apparatus of example 6, wherein the latency collector is to determine the latency by smoothing the real-time latencies with a moving average of the real-time latencies.

Example 8 includes the apparatus of example 6, wherein the latency collector is to collect the real-time latencies from at least one latency monitor in at least one of the first geographic region or the second geographic region.

Example 9 includes the apparatus of example 1, wherein the recommendation engine is to present the migration recommendation via a display, the migration recommendation including at least one of a cost improvement or a latency performance improvement corresponding to migrating the first service to the second geographic region.

Example 10 includes a non-transitory computer readable storage medium including instructions that, when executed by one or more processors, cause the one or more processors to at least generate an interaction graph, the interaction graph including first and second nodes and an edge therebetween, the first node representative of a first service in a first geographic region, the second node representative of a second service in a second geographic region, and the edge representative of a network path of interactions between the first and second services, determine a weight value of the edge between the first and second services based on a count of network interactions between the first and second services and a latency between the first and second services, and generate a migration recommendation to migrate the first service to the second geographic region based on the weight value of the edge.

Example 11 includes the non-transitory computer readable storage medium of example 10, wherein the instructions are to cause the one or more processors to generate the migration recommendation based on a first global latency factor determined based on (a) the weight value, and (b) the first service being in the first geographic region, a second global latency factor determined based on (a) a second weight value, and (b) the first service being in the second geographic region, and a latency improvement in the second global latency factor relative to the first global latency factor.

Example 12 includes the non-transitory computer readable storage medium of example 11, wherein the latency improvement is based on a latency factor change between the first and second global latency factors being greater than a threshold latency decrease value.

Example 13 includes the non-transitory computer readable storage medium of example 10, wherein the instructions are to further cause the one or more processors to collect the count of network interactions between the first service in the first geographic region and the second service in the second geographic region.

Example 14 includes the non-transitory computer readable storage medium of example 13, wherein the network interactions are monitored by sidecar containers monitoring network interactions and source details incoming to the first and second services.

Example 15 includes the non-transitory computer readable storage medium of example 10, wherein the instructions are to further cause the one or more processors to collect real-time latencies between the first and second services across the first and second geographic regions, the latency is based on the real-time latencies.

Example 16 includes the non-transitory computer readable storage medium of example 15, wherein the instructions are to cause the one or more processors to determine the latency by smoothing the real-time latencies with a moving average of the real-time latencies.

Example 17 includes the non-transitory computer readable storage medium of example 15, wherein the instructions are to cause the one or more processors to collect the real-time latencies from at least one latency monitor in at least one of the first geographic region or the second geographic region.

Example 18 includes the non-transitory computer readable storage medium of example 10, wherein the instructions are further to cause the one or more processors to present the migration recommendation via a display, the migration recommendation including at least one of a cost improvement or a latency performance improvement corresponding to migrating the first service to the second geographic region.

Example 19 includes a method to determine a migration recommendation of a service between geographic regions, the method including generating an interaction graph, the interaction graph including first and second nodes and an edge therebetween, the first node representative of a first service in a first geographic region, the second node representative of a second service in a second geographic region, and the edge representative of a network path of interactions between the first and second services, determining a weight value of the edge between the first and second services based on a count of network interactions between the first and second services and a latency between the first and second services, and generating a migration recommendation to migrate the first service to the second geographic region based on the weight value of the edge.

Example 20 includes the method of example 19, wherein the generating of the migration recommendation is based on a first global latency factor determined based on (a) the weight value, and (b) the first service being in the first geographic region, a second global latency factor determined based on (a) a second weight value, and (b) the first service being in the second geographic region, and a latency improvement in the second global latency factor relative to the first global latency factor.

Example 21 includes the method of example 20, wherein the latency improvement is based on a latency factor change between the first and second global latency factors being greater than a threshold latency decrease value.

Example 22 includes the method of example 19, further including collecting the count of network interactions between the first service in the first geographic region and the second service in the second geographic region.

Example 23 includes the method of example 22, wherein the network interactions are monitored by sidecar containers monitoring network interactions and source details incoming to the first and second services.

Example 24 includes the method of example 19, further including collecting real-time latencies between the first and second services across the first and second geographic regions, the latency is based on the real-time latencies.

Example 25 includes the method of example 24, further including determining the latency by smoothing the real-time latencies with a moving average of the real-time latencies.

Example 26 includes the method of example 24, further including collecting the real-time latencies from at least one latency monitor in at least one of the first geographic region or the second geographic region.

Example 27 includes the method of example 19, further including presenting the migration recommendation via a display, the migration recommendation including at least one of a cost improvement or a latency performance improvement corresponding to migrating the first service to the second geographic region.

Example 28 includes an apparatus to determine a migration recommendation of a service between geographic regions, the apparatus including means for generating an interaction graph, the interaction graph including first and second nodes and an edge therebetween, the first node representative of a first service in a first geographic region, the second node representative of a second service in a second geographic region, and the edge representative of a network path of interactions between the first and second services, means for determining a weight value of the edge between the first and second services based on a count of network interactions between the first and second services and a latency between the first and second services, and means for generating a migration recommendation to migrate the first service to the second geographic region based on the weight value of the edge.

Example 29 includes the apparatus of example 28, wherein the means for generating the migration recommendation is to generate the migration recommendation based on a first global latency factor determined based on (a) the weight value, and (b) the first service being in the first geographic region, a second global latency factor determined based on (a) a second weight value, and (b) the first service being in the second geographic region, and a latency improvement in the second global latency factor relative to the first global latency factor.

Example 30 includes the apparatus of example 29, wherein the latency improvement is based on a latency factor change between the first and second global latency factors being greater than a threshold latency decrease value.

Example 31 includes the apparatus of example 28, further including means for collecting the count of network interactions between the first service in the first geographic region and the second service in the second geographic region.

Example 32 includes the apparatus of example 31, wherein the network interactions are monitored by sidecar containers monitoring network interactions and source details incoming to the first and second services.

Example 33 includes the apparatus of example 28, further including means for collecting real-time latencies between the first and second services across the first and second geographic regions, the latency is based on the real-time latencies.

Example 34 includes the apparatus of example 33, wherein the means for collecting real-time latencies is to determine the latency by smoothing the real-time latencies with a moving average of the real-time latencies.

Example 35 includes the apparatus of example 33, wherein the means for collecting real-time latencies is to collect the real-time latencies from at least one latency monitor in at least one of the first geographic region or the second geographic region.

Example 36 includes the apparatus of example 28, wherein the means for generating a migration recommendation is to present the migration recommendation, the migration recommendation including at least one of a cost improvement or a latency performance improvement corresponding to migrating the first service to the second geographic region.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to determine a migration recommendation of a service between geographic regions, the apparatus comprising:
    a graph generator to generate an interaction graph, the interaction graph including first and second nodes, the first node representative of a first service in a first geographic region, and the second node representative of a second service in a second geographic region; and
    a recommendation engine to:
        generate an inter-region interaction count, the inter-region interaction count including first network interactions between the first node and outside nodes, the outside nodes representative of outside services provided in a plurality of geographic regions outside of the first geographic region and the second node being one of the outside nodes,
        generate an intra-region interaction count, the intra-region interaction count including second network interactions between the first node and inside nodes, the inside nodes representative of inside services provided inside of the first geographic region;
        select the first node as a target migration node to be migrated based on a comparison of the inter-region interaction count and the intra-region interaction count; and generate the migration recommendation to migrate the first service to the second geographic region, the migration recommendation based on:
  a first global latency factor determined based on: (a) a first weight value generated for an edge between the first node and the second node, and (b) the first service being in the first geographic region;
  a second global latency factor determined based on: (a) a second weight value generated for the edge between the first node and the second node, and (b) the first service being in the second geographic region; and
  a latency improvement in the second global latency factor relative to the first global latency factor.

2. The apparatus of claim 1, wherein the latency improvement is based on a latency factor change between the first and second global latency factors being greater than a threshold latency decrease value.

3. The apparatus of claim 1, further including:
  a weighing engine to determine a weight value for an edge between the first and second services, based on a count of network interactions between the first and second services and a latency between the first and second services; and
  a count collector to collect the count of network interactions between the first service and the second service.

4. The apparatus of claim 3, further including a latency collector to collect real-time latencies between the first and second services across the first and second geographic regions, the latency being based on the real-time latencies.

5. The apparatus of claim 4, wherein the latency collector is to determine the latency by smoothing the real-time latencies with a moving average of the real-time latencies.

6. The apparatus of claim 4, wherein the latency collector is to collect the real-time latencies from at least one latency monitor in at least one of the first geographic region or the second geographic region.

7. The apparatus of claim 1, wherein the recommendation engine is to present the migration recommendation via a display, the migration recommendation including at least one of a cost improvement or a latency performance improvement corresponding to migrating the first service to the second geographic region.

8. A non-transitory computer readable storage medium comprising instructions that, when executed by one or more processors, cause the one or more processors to at least:
  generate an interaction graph, the interaction graph including first and second nodes and an edge therebetween, the first node representative of a first service in a first geographic region, the second node representative of a second service in a second geographic region, and the edge representative of a network path of interactions between the first and second services;
  determine a weight value of the edge between the first and second nodes based on network interactions between the first and second services and a latency between the first and second services;
  generate an inter-region interaction count representative of network interactions between the first node and outside nodes, the outside nodes representative of services provided in a plurality of geographic regions outside of the first geographic region, and the second node being one of the outside nodes;
  generate an intra-region interaction count representative of network interactions between the first node and inside nodes, the inside nodes representative of services in the first geographic region; and
  generate a migration recommendation to migrate the first service to the second geographic region based on:
    the weight value of the edge; and
    a comparison of the inter-region interaction count and the intra-region interaction count;
    a first global latency factor determined based on: (a) the weight value, and (b) the first service being in the first geographic region;
    a second global latency factor determined based on: (a) a second weight value, and (b) the first service being in the second geographic region; and
    a latency improvement in the second global latency factor relative to the first global latency factor.

9. The non-transitory computer readable storage medium of claim 8, wherein the latency improvement is based on a latency factor change between the first and second global latency factors being greater than a threshold latency decrease value.

10. The non-transitory computer readable storage medium of claim 8, wherein the instructions are to cause the one or more processors to collect real-time latencies between the first and second services across the first and second geographic regions, the latency being based on the real-time latencies.

11. The non-transitory computer readable storage medium of claim 10, wherein the instructions are to cause the one or more processors to determine the latency by smoothing the real-time latencies with a moving average of the real-time latencies.

12. The non-transitory computer readable storage medium of claim 10, wherein the instructions are to cause the one or more processors to collect the real-time latencies from at least one latency monitor in at least one of the first geographic region or the second geographic region.

13. The non-transitory computer readable storage medium of claim 8, wherein the instructions are to cause the one or more processors to present the migration recommendation via a display, the migration recommendation including at least one of a cost improvement or a latency performance improvement corresponding to migrating the first service to the second geographic region.

14. A method to determine a migration recommendation of a service between geographic regions, the method comprising:
  generating an interaction graph, the interaction graph including first and second nodes and an edge therebetween, the first node representative of a first service in a first geographic region, the second node representative of a second service in a second geographic region, and the edge representative of a network path of interactions between the first and second services;
  determining a weight value of the edge between the first and second nodes based on network interactions between the first and second services and a latency between the first and second services;
  generating an inter-region interaction count representative of first network interactions between the first node and outside nodes, the outside nodes representative of services provided in a plurality of geographic regions outside of the first geographic region, and the second node being one of the outside nodes;
  generating an intra-region interaction count representative of second network interactions between the first node and inside nodes, the inside nodes representative of services provided in the first geographic region; and
  generating the migration recommendation to migrate the first service to the second geographic region based on:

the weight value of the edge;
a comparison of the inter-region interaction count and the intra-region interaction count; and
a first global latency factor determined based on: (a) the weight value, and (b) the first service being in the first geographic region;
a second global latency factor determined based on: (a) a second weight value, and (b) the first service being in the second geographic region; and
a latency improvement in the second global latency factor relative to the first global latency factor.

15. The method of claim 14, wherein the latency improvement is based on a latency factor change between the first and second global latency factors being greater than a threshold latency decrease value.

16. The method of claim 14, further including collecting real-time latencies between the first and second services across the first and second geographic regions, the latency being based on the real-time latencies.

17. The method of claim 16, further including determining the latency by smoothing the real-time latencies with a moving average of the real-time latencies.

18. The method of claim 16, further including collecting the real-time latencies from at least one latency monitor in at least one of the first geographic region or the second geographic region.

19. The method of claim 14, further including presenting the migration recommendation via a display, the migration recommendation including at least one of a cost improvement or a latency performance improvement corresponding to migrating the first service to the second geographic region.

20. An apparatus to determine a migration recommendation of a service between geographic regions, the apparatus comprising:
means for generating an interaction graph, the interaction graph including a first node and a second node and an edge therebetween, the first node representative of a first service in a first geographic region, the second node representative of a second service in a second geographic region, and the edge representative of a network path of interactions between the first and second services;
means for determining a weight value of the edge between the first and second nodes based on first network interactions between the first and second services and a latency between the first and second services;
means for generating an inter-region interaction count and an intra-region interaction count to:
generate an inter-region interaction count representative of a first count of network interactions between the first node and outside nodes, the outside nodes representative of outside services provided in a plurality of geographic regions outside of the first geographic region, and the second node being one of the outside nodes; and
generate an intra-region interaction count representative of a second count of network interactions between the first node and inside nodes, the inside nodes representative of services in the first geographic region; and
means for generating the migration recommendation to migrate the first service to the second geographic region based on:
the weight value of the edge;
a comparison of the inter-region interaction count and the intra-region interaction count;
a first global latency factor determined based on: (a) the weight value, and (b) the first service being in the first geographic region;
a second global latency factor determined based on: (a) a second weight value, and (b) the first service being in the second geographic region; and
a latency improvement in the second global latency factor relative to the first global latency factor.

21. The apparatus of claim 20, wherein the latency improvement is based on a change between the first and second global latency factors being greater than a threshold latency decrease value.

22. The apparatus of claim 20, further including means for collecting real-time latencies between the first and second services across the first and second geographic regions, the latency being based on the real-time latencies.

23. The apparatus of claim 22, wherein the means for collecting real-time latencies is to determine the latency by smoothing the real-time latencies with a moving average of the real-time latencies.

24. The apparatus of claim 22, wherein the means for collecting real-time latencies is to collect the real-time latencies from at least one latency monitor in at least one of the first geographic region or the second geographic region.

25. The apparatus of claim 20, wherein the means for generating the migration recommendation is to present the migration recommendation, the migration recommendation including at least one of a cost improvement or a latency performance improvement corresponding to migrating the first service to the second geographic region.

* * * * *